US012217359B2

(12) United States Patent
Gratz

(10) Patent No.: US 12,217,359 B2
(45) Date of Patent: Feb. 4, 2025

(54) THREE-DIMENSIONAL RENDERING OF SPORTING EVENT FROM TWO-DIMENSIONAL VIDEO STREAM

(71) Applicant: Joseph Gratz, Valparaiso, IN (US)

(72) Inventor: Joseph Gratz, Valparaiso, IN (US)

( * ) Notice: Subject to any disclaimer, the term of this patent is extended or adjusted under 35 U.S.C. 154(b) by 505 days.

(21) Appl. No.: 17/691,888

(22) Filed: Mar. 10, 2022

(65) Prior Publication Data
US 2022/0292766 A1  Sep. 15, 2022

Related U.S. Application Data

(60) Provisional application No. 63/159,272, filed on Mar. 10, 2021.

(51) Int. Cl.
| | |
|---|---|
| *G06T 17/00* | (2006.01) |
| *G06V 10/25* | (2022.01) |
| *G06V 10/764* | (2022.01) |
| *G06V 20/40* | (2022.01) |

(52) U.S. Cl.
CPC ............. *G06T 17/00* (2013.01); *G06V 10/25* (2022.01); *G06V 10/764* (2022.01); *G06V 20/42* (2022.01)

(58) Field of Classification Search
None
See application file for complete search history.

(56) References Cited

U.S. PATENT DOCUMENTS

| | | |
|---|---|---|
| 7,561,989 B2 | 7/2009 | Banks et al. |
| 8,493,448 B2 | 7/2013 | Burazerovic |
| 8,537,200 B2 | 9/2013 | Karczewicz et al. |
| (Continued) | | |

FOREIGN PATENT DOCUMENTS

| | | |
|---|---|---|
| CN | 102938845 B | 4/2015 |
| KR | 101004758 B1 | 1/2011 |
| (Continued) | | |

OTHER PUBLICATIONS

Calagari, Kiana et al., "Data Driven 2D-to-3D Video Conversion for Soccer", DOI 10.1109/TMM.2017.2748458.

(Continued)

*Primary Examiner* — Peter Hoang
(74) *Attorney, Agent, or Firm* — Neal, Gerber & Eisenberg LLP

(57) ABSTRACT

Methods and apparatus are disclosed for three-dimensional mappings of sporting events from two-dimensional video streams. An example system comprises processor(s) that generate a virtual three-dimensional rendering of a physical field-of-play. The processor(s) generate camera angle entries of a reference database each of which corresponds with a virtual image of the virtual rendering and includes a virtual camera angle setting at which the virtual image is captured and two-dimensional coordinates of static feature(s) of the virtual rendering. For each frame within a video stream, the processor(s) identify two-dimensional coordinates of static feature(s) of the physical field-of-play, determines a matching virtual camera angle setting by comparing the two-dimensional coordinates, and translate objects-of-interest within the frame onto the virtual rendering based on a virtual camera position setting and the matching virtual camera angle setting.

20 Claims, 21 Drawing Sheets

(56) References Cited

U.S. PATENT DOCUMENTS

| | | |
|---|---|---|
| 8,786,596 B2 | 7/2014 | House |
| 8,928,729 B2* | 1/2015 | Schnyder ............. H04N 13/264 |
| | | 348/43 |
| 9,619,891 B2 | 4/2017 | Bose et al. |
| 10,015,478 B1 | 7/2018 | Rabin et al. |
| 10,181,192 B1 | 1/2019 | Pham |
| 10,410,365 B2 | 9/2019 | Ganapati et al. |
| 10,425,634 B2 | 9/2019 | Hefeeda et al. |
| 2014/0098296 A1 | 4/2014 | Arora et al. |
| 2018/0164876 A1* | 6/2018 | Smit ....................... G06F 3/011 |
| 2020/0286279 A1 | 9/2020 | Sheng |

FOREIGN PATENT DOCUMENTS

| | | |
|---|---|---|
| KR | 101164894 B1 | 7/2012 |
| WO | 2020097750 A1 | 5/2020 |

OTHER PUBLICATIONS

Chen, Hua-Tsung et al., "Physics-based ball tracking and 3D trajectory reconstruction with applications to shooting location estimation in basketball video", J. Vis. Commun. Image R. 20 (2009) 204-216.

* cited by examiner

THREE-DIMENSIONAL RENDERING OF SPORTING EVENT FROM TWO-DIMENSIONAL VIDEO STREAM

CROSS-REFERENCE TO RELATED APPLICATION

This application claims the benefit of U.S. Provisional Patent Application Ser. No. 63/159,272, filed on Mar. 10, 2021, which is incorporated by reference in its entirety.

TECHNICAL FIELD

The present disclosure generally relates to sporting events and, more specifically, to three-dimensional renderings of sporting events from two-dimensional video streams.

BACKGROUND

Professional and amateur sports is a competitive field. Historically, athletes and sporting organizations have looked to get a leg up on competitors through training and practices. Recently, more and more athletes and sporting organizations have turned to sports analytics to gain an edge over competitors. Generally speaking, the use of sports analytics refers to the process of analyzing data of past sporting events to facilitate athletes, trainers, coaches, and sports organizations in making decisions during and prior to sporting events. For instance, coaches and athletes may use sports analytics to develop strategies for an upcoming competition. Sports organizations may use sports analytics to develop strategies for constructing a team.

The collection of reliable data is typically important in the field. For instance, it is important to collect data that accurately locates the positions of objects (e.g., players, balls, etc.) on a field-of-play throughout a sporting event in order to develop advanced analytics on characteristics (e.g., distance traveled, average speed, etc.) of those objects during the sporting event.

Various known sports analytic techniques require data being simultaneously collected from multiple fixed vantage points in order to accurately determine locations of objects on a field-of-play throughout a sporting event. For instance, some such techniques use images or video from multiple vantage points to triangulate the location of a three-dimensional object (e.g., a player, a ball) on a three-dimensional surface (e.g., a field-of-play) based on two-dimensional data of images or video. Such known techniques require the locations and orientations of the multiple cameras to be fixed and known in order to accurately triangulate the locations of objects on the field-of-play.

Typically, most observers of sporting events do not have access to multiple, simultaneous video streams of a sporting event. Rather, most observers of a sporting event have access to a single stream broadcast. Additionally, the broadcast is typically edited in real-time to incorporate video collected from multiple different angles (e.g., wide angles, full field shots, close-ups, etc.). That is, the angle and position of video of the field-of-play changes repeatedly throughout a single stream broadcast of a sporting event. As a result, single stream broadcasts oftentimes cannot be used for performing advanced sports analytics, thereby limiting those who can perform such analytics to those who have access to multiple, simultaneous video streams of sporting events. Therefore, there remains a continuing need for a process that enables advanced sporting analytics to be performed based on a single stream of a sporting event that is typically broadcasted for sporting events.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for a three-dimensional rendering of a sporting event from a two-dimensional video stream. An example disclosed system for translating two-dimensional sporting event video streams onto virtual three-dimensional fields-of-play comprises a reference database configured to store information of a virtual three-dimensional rendering of a physical field-of-play and one or more processors. The one or more processors are configured to generate the virtual three-dimensional rendering. The one or more processors are configured to generate camera angle entries of the reference database each of which corresponds with a virtual image of the virtual three-dimensional rendering captured from a virtual camera position setting and includes a virtual camera angle setting at which the virtual image is captured and two-dimensional coordinates of one or more static features of the virtual three-dimensional rendering. For each frame within one of a plurality of tracking sessions of a two-dimensional video stream of a sporting event occurring on the physical field-of-play, the one or more processors are configured to identify two-dimensional coordinates of one or more static features of the physical field-of-play, determine a matching virtual camera angle setting by comparing the two-dimensional coordinates of the one or more static features of the physical field-of-play to the two-dimensional coordinates of the one or more static features of the camera angle entries in the reference database, and translate objects-of-interest within the frame onto the virtual three-dimensional rendering based on the virtual camera position setting and the matching virtual camera angle setting.

In some examples, the virtual camera angle setting of each of the camera angle entries of the reference database includes an x-axis rotation, a y-axis rotation, and a field-of-view.

In some examples, the one or more processors are configured to create a virtual video rendering of the sporting event on the virtual three-dimensional rendering based on the translation of the objects-of-interest onto the virtual three-dimensional rendering for each of the frames of the plurality of tracking sessions. In some such examples, the one or more processors are configured to create the virtual video rendering from one or more selectable virtual camera settings.

In some examples, the one or more processors are configured to generate sports analytics for the sporting event based on an analysis of locations of the objects-of-interest on the virtual three-dimensional rendering for one or more of the frames of the plurality of tracking sessions.

In some examples, each of the two-dimensional coordinates of the one or more static features within a respective virtual image of the virtual three-dimensional rendering includes an x-coordinate and a y-coordinate within the virtual image. In some such examples, each of the two-dimensional coordinates of the one or more static features of the physical field-of-play includes an x-coordinate and a y-coordinate within a respective frame of the two-dimensional video stream.

In some examples, to translate the objects-of-interest onto the virtual three-dimensional rendering for each frame, the one or more processors are further configured to identify two-dimensional coordinates of the objects-of-interest within the frame and generate virtual coordinates of the objects-of-interest on the virtual three-dimensional rendering based on the two-dimensional locations of the objects-of-interest within the frame, the virtual camera position setting, and the matching virtual camera angle setting. Some such examples further comprise a 3D database configured to store the virtual coordinates of the objects-of-interest on the virtual three-dimensional rendering for each of the frames of the plurality of tracking sessions of the two-dimensional video stream.

In some examples, the one or more processors are configured to identify each of the plurality of tracking sessions of the two-dimensional video stream by detecting a respective continuous sequence of the frames that each matches with one of the virtual images stored within the reference database.

In some examples, the one or more processors are configured to utilize an image recognition algorithm to detect, classify, and label the objects-of-interest. In some such examples, the one or more processors are configured to utilize a tracking algorithm to track the objects-of-interest that have been identified between the frames of a respective one of the plurality of tracking sessions of the two-dimensional video stream.

In some examples, for each of the frames of the plurality of tracking sessions, the one or more processors are configured to determine whether one or more of the objects-of-interest is missing from the frame based on review of the frame, a predefined number of preceding frames, and predefined number of subsequent frames; and, responsive to determining that one or more of the objects-of-interest is missing from the frame, estimate a location for each of the one or more of the objects-of-interest that is missing utilizing linear interpolation between locations of the each of the one or more of the objects-of-interest within the preceding frames and the subsequent frames.

In some examples, the information of the virtual three-dimensional rendering stored in the reference database includes the virtual camera position setting, and the one or more processors are configured to retrieve the virtual camera position setting for the virtual three-dimensional rendering from the reference database. In some such examples, prior to the reference database storing the virtual camera position setting, the one or more processors are configured to identify the virtual camera position setting for the virtual three-dimensional rendering. Further, in some such examples, to identify the virtual camera position setting for the virtual three-dimensional rendering, the one or more processors are configured to generate camera position entries of the reference database each of which corresponds with a virtual image of the virtual three-dimensional rendering captured from a virtual camera position setting and includes a virtual camera setting and angle settings at which the virtual image is captured and two-dimensional coordinates of a plurality of preselected static points of the virtual three-dimensional rendering, select a frame of the two-dimensional video stream in which each of a plurality of preselected static points of the physical field-of-play is present, identify two-dimensional coordinates of the plurality of preselected static points of the physical field-of-play, and determine the virtual camera position setting for the virtual three-dimensional rendering by matching the two-dimensional coordinates of the plurality of preselected static points of the physical field-of-play to the two-dimensional coordinates of the plurality of preselected static points of one of the camera position entries in the reference database.

An example disclosed method for translating two-dimensional sporting event video streams onto virtual three-dimensional fields-of-play comprises generating, via one or more processors, a virtual three-dimensional rendering of a physical field-of-play. The example disclosed method also comprises generating, via the one or more processors, camera angle entries of a reference database each of which correspond with a virtual image of the virtual three-dimensional rendering captured from a virtual camera position setting and includes a virtual camera angle setting at which the virtual image is captured and two-dimensional coordinates of one or more static features of the virtual three-dimensional rendering. The example disclosed method also comprises, for each frame within one of a plurality of tracking sessions of a two-dimensional video stream of a sporting event occurring on the physical field-of-play, identifying two-dimensional coordinates of one or more static features of the physical field-of-play; selecting a matching virtual camera angle setting by comparing the two-dimensional coordinates of the one or more static features of the physical field-of-play to the two-dimensional coordinates of the one or more static features of the camera angle entries in the reference database; and translating objects-of-interest within the frame onto the virtual three-dimensional rendering based on the virtual camera position setting and the matching virtual camera angle setting.

Some examples further comprise creating a virtual video rendering of the sporting event on the virtual three-dimensional rendering based on the translation of the objects-of-interest onto the virtual three-dimensional rendering for each of the frames of the plurality of tracking sessions.

Some examples further comprise generating sports analytics for the sporting event based on an analysis of locations of the objects-of-interest on the virtual three-dimensional rendering for one or more of the frames of the plurality of tracking sessions.

An example disclosed tangible computer readable medium including instructions that, when executed, cause one or more machines to generate a virtual three-dimensional rendering of a physical field-of-play. The instructions, when executed, also cause the one or more machines to generate camera angle entries of a reference database each of which corresponds with a virtual image of the virtual three-dimensional rendering captured from a virtual camera position setting and includes a virtual camera angle setting at which the virtual image is captured and two-dimensional coordinates of one or more static features of the virtual three-dimensional rendering. The instructions, when executed, also cause the one or more machines to, for each frame within one of a plurality of tracking sessions of a two-dimensional video stream of a sporting event occurring on the physical field-of-play, identify two-dimensional coordinates of one or more static features of the physical field-of-play; select a matching virtual camera angle setting by comparing the two-dimensional coordinates of the one or more static features of the physical field-of-play to the two-dimensional coordinates of the one or more static features of the camera angle entries in the reference database; and translate objects-of-interest within the frame onto the virtual three-dimensional rendering based on the virtual camera position setting and the matching virtual camera angle setting.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
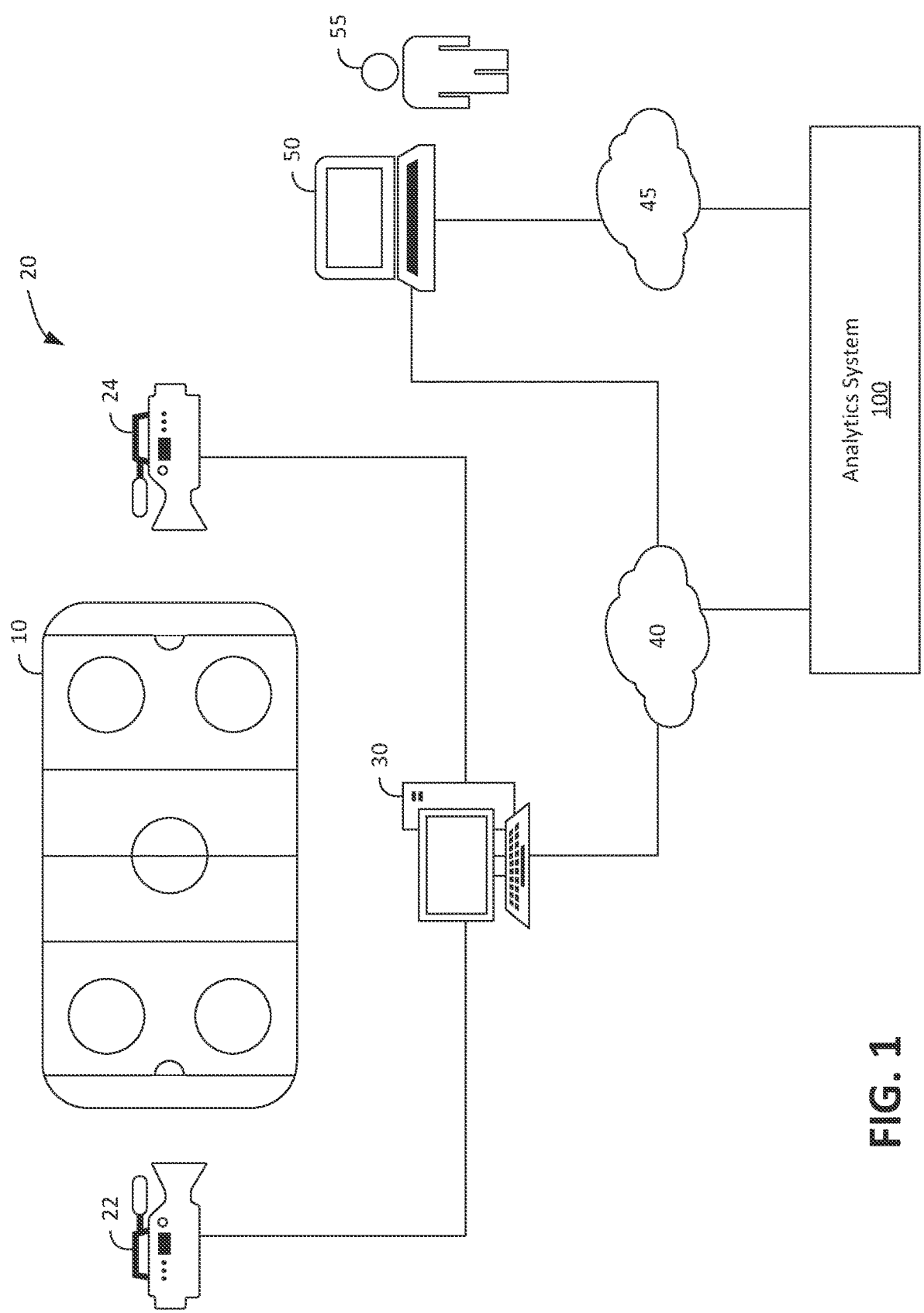
FIG. 1 depicts an example environment in which a single two-dimensional video stream of a sporting event is mapped onto a virtual three-dimensional field-of-play rendering in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Example systems and methods disclosed herein a process that enable advanced sporting analytics to be performed based on a single stream of a sporting event that is typically broadcasted for sporting events, thereby reducing costs and increasing accessibility related to the generation of sports analytics.

The systems and methods disclosed herein generate a virtual three-dimensional rendering of a field-of-play on which sporting events occur and maintains a reference database that includes virtual images of the virtual three-dimensional rendering, information on virtual camera settings at which the virtual images are captured, and coordinates within the virtual images of key features (e.g., boundary lines, goal areas, boards, etc.) of the virtual three-dimensional rendering. Frames of a single two-dimensional video stream of a sporting event played on the field-of-play are processed to identify coordinates of the key features of the field-of-play. Subsequently, the location of the key features within the frames are compared to those within entries of the reference database in order to identify camera settings at which the frames of the video stream were captured. That is, a frame of the video stream is matched with a virtual image using the identified locations of the key features in order to identify camera settings of a camera that captured the frame of the video stream. Using the identified camera settings, other objects (e.g., players, balls, etc.) within the frames of the video stream are accurately translated onto locations of the virtual three-dimensional rendering. Subsequently, a virtual recreation of the sporting event is generated on the virtual three-dimensional rendering and/or sports analytics of the sporting event are generated using data corresponding with the virtual recreation.

Thus, examples disclosed herein include a specific set of rules that provide an unconventional technological solution of identifying camera settings at which a camera has captured a frame of single two-dimensional video stream. The unconventional technological solution addresses the technological problem of accurately locating the position of moving objects on a three-dimensional field-of-play based on a single two-dimensional video stream of a sporting event in order to enable advanced sporting analytics of the sporting event to be generated using a single two-dimensional video stream.

As used herein, a "field-of-play" and a "physical field-of-play" refer to a real-life, physical surface marked by boundaries on which a sporting event is played. Example fields-of-play include rinks, fields, pitches, courts, etc.

As used herein, a "single video stream" and a "single stream" refers to a broadcasted and/or streamed video that includes a one sequence of frames captured by camera(s). For example, a single video stream does not include multiple simultaneous video streams of an event, such as a sporting event, captured from multiple respective cameras at different angles. Example video streams may include frames that are captured from a plurality of different cameras and are edited into a single sequence of frames. Example single video streams include two-dimensional video streams in which video is shown in two dimensions.

As used herein, a "virtual three-dimensional rendering" and a "virtual rendering" refers to a three-dimensional computer-generated recreation of a real-life physical object. As used herein, a "virtual three-dimensional field-of-play rendering" and a "field-of-play rendering" refers to a three-dimensional computer-generated recreation of a real-life field-of-play. As used herein, a "virtual video recreation" and a "virtual video rendering" refer to three-dimensional computer-generated recreation of real-life sequence-of-events, such as a sporting event played on a field-of-play.

As used herein, a "physical camera" refers to a real-life optical instrument that captures images and/or video of real-life objects, such as a field-of-play. As used herein, a "virtual camera" refers to a virtual representation of an optical instrument that captures images and/or video of virtual renderings of objects.

As used herein, a "camera setting" refers to orientation, and/or other setting of a camera from which the camera captures images and/or video. Example camera settings include camera position settings and camera angle settings. As used herein, a "camera position setting" refers to a location of a camera that captures images and/or video. As used herein, a "camera angle setting" refers to an orientation, and/or other setting of a camera from which the camera captures images and/or video. Example camera angle settings include an x-axis rotation, a y-axis rotation, an angle-of-view, and/or a field-of-view. As used herein, an "angle-of-view" refers to the angular extent of a scene that is included in an image or video captured by a camera. As used herein, a "field-of-view" refers to a measurement of distance that indicates the extent of a scene included in an image or video captured by a camera. As used herein, a "physical camera setting" refers to a camera setting of a physical camera. Example physical camera settings include physical camera position settings and physical camera angle settings. As used herein, a "virtual camera setting" refers to a camera angle setting of a virtual camera. Example virtual camera settings include virtual camera position settings and virtual camera angle settings.

As used herein, an "object-of-interest" refers to an moveable object that moves along a surface, such as a field-of-play, and whose location is monitored for subsequent analysis. Example objects-of-interest on a field-of-play include players, balls, etc. As used herein, a "key feature" and a "static feature" refer to static objects on and/or adjacent a surface, such as a field-of-play. Example key features of a field-of-play include boundary lines, goals, walls, boards, etc. Example key features include key points. As used herein, a "static point" and a "key point" refer to a static object on and/or adjacent a surface, such as a field-of-play, that is capable of being represented by a single point. Example key points of a hockey rink include face-off spots and a center-point of a goal-line. As used herein, a "tracking session" refers to a continuous sequence of frames of a single video stream of which each frame includes identifying static features. A single video stream may include a plurality of tracking sessions that are interrupted by other frame that do not include identifying static features.

As used herein, a "classified object" refers to an object-of-interest within an image and/or a frame of a video that has been categorized as a particular type of object. Objects-of-interest may be classified using image recognition algorithm(s), machine learning algorithm(s), and/or other type(s) of algorithm(s). Example object classifications include players, referees, goals, balls, pucks, etc. As used herein, a "marked object" refers to an object-of-interest within one or more frames of a tracking session that has been categorized and marked with a unique marker ID. Objects-of-interest may be marked using automated algorithm(s). A marked objects may have one unique marker ID across continuous frames in which it appears and has been identified as the same object, for example due to classification, location, etc. An object-of-interest may be given another unique marker ID for another subsequent set of continuous frames. That is, each object-of-interest may be marked with a unique marker ID for each set of continuous frames in which it appears and has been identified as the same object. As used herein, a "labeled object" refers to an object-of-interest that has been labeled with a respective real-world identifier. An example label includes a combination of team identifier (e.g., home, away, team name, etc.) and uniform number of a player (e.g., player #19 of the Chicago Hockey Team).

Turning to the figures, FIG. 1 illustrates an example environment in which a analytics system 100 maps a single two-dimensional video stream of a sporting event onto a virtual three-dimensional field-of-play rendering in order to generate sports analytics in accordance with the teachings herein. The sporting event is performed on a physical field-of-play 10. A sportscast system 300 includes one or more cameras 22, 24 and a production-control computing system 30. The cameras 22, 24 that are arranged around the field-of-play to capture two-dimensional video of the sporting event from various perspectives surrounding the field-of-play 10. The production-control computing system 30 is configured to receive the two-dimensional video from the cameras 22, 24, edit the video into a single two-dimensional video stream, and transmit the single two-dimensional video stream for viewing via a network 40 (e.g., via a wired and/or a wireless connection). The network 40 may be a public network, such as the Internet; a private network, such as an intranet; or combinations thereof. In the illustrated example, the analytics system 100 and a computing device 50 of a user 55 are communicatively connected to the network 40 in order to receive the single two-dimensional video stream of the sporting event for viewing.

As disclosed below in greater detail, upon receiving the single two-dimensional video stream, the analytics system 100 processes frames of the single two-dimensional video stream and identifies coordinates of static features within the field-of-play. The analytics system 100 also generates a virtual three-dimensional rendering of the field-of-play 10 and maintains a reference database (e.g., a reference database 250 of FIGS. 2-3) that includes data for the virtual rendering. The analytics system 100 compares the location of the key features within the frames of the video stream to reference data within the reference database in order to identify camera settings at which the frames of the video stream were captured. The analytics system then uses the identified camera settings, to accurately position other objects-of-interest (e.g., players, balls, etc.) of the sporting event from the frames of the two-dimensional video stream and onto the virtual three-dimensional rendering. Subsequently, the analytics system 100 generates a virtual video recreation of the sporting event and generates analytics of the sporting event based on data corresponding with the virtual video recreation.

The analytics system 100 and the computing device 50 of the user 55 also are communicatively connected to another network 45 (e.g., via a wired and/or a wireless connection). For example, the analytics system 100 is configured to receive requests related to sports analytics from the user 55 via the network 45. The computing device 50 enables to the user 55 to request access to and/or view the video stream of the sporting event, the virtual video recreation, and/or sports analytics associated with the sporting event from the analytics system 100 and/or other sources. The network 45 may be a public network, such as the Internet; a private network, such as an intranet; or combinations thereof. In the illustrated example, the network 45 is separate from the network 40. In other examples, the network 40 and the network 45 are integrally formed.

Figure 2:
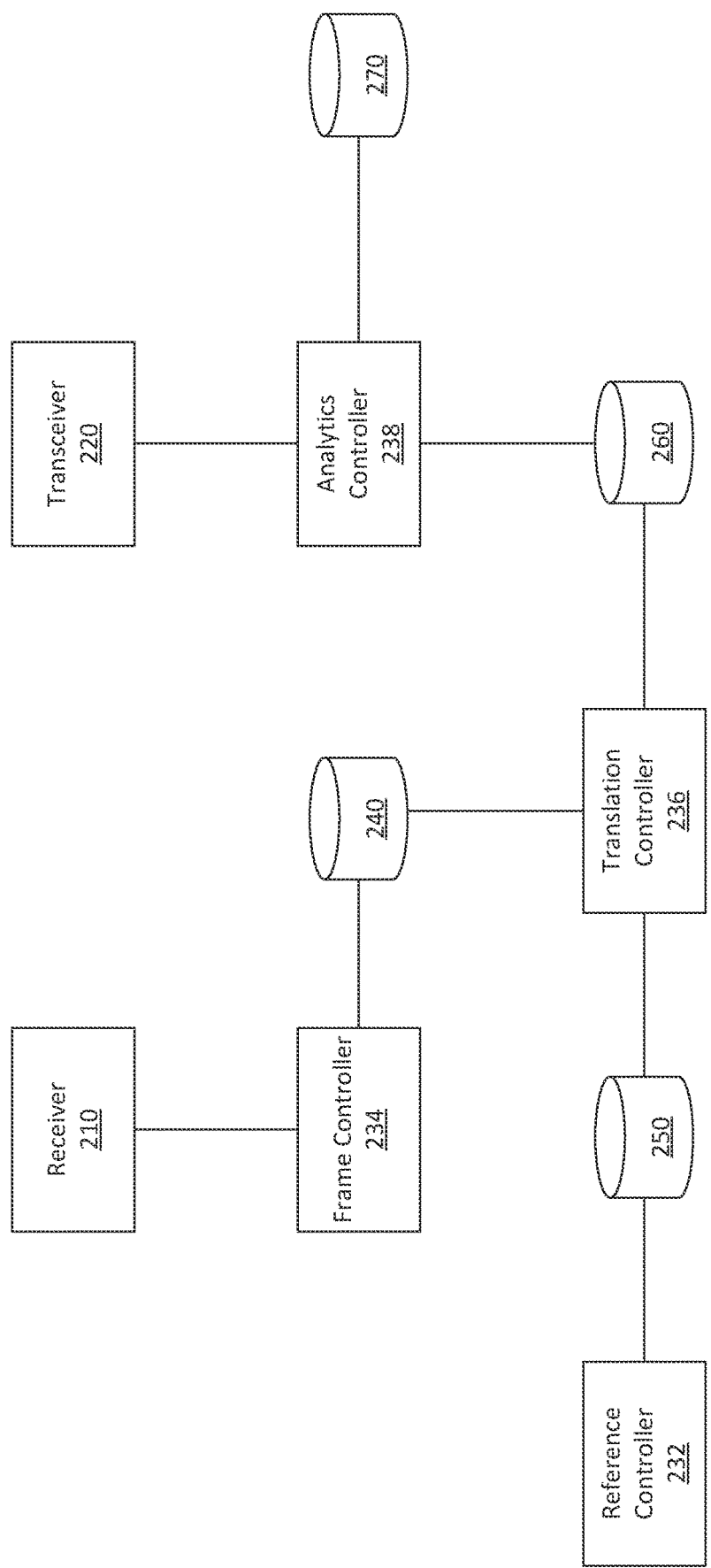
FIG. 2 is a block diagram of an example system to map a single two-dimensional video stream of a sporting event onto a virtual three-dimensional field-of-play rendering in accordance with the teachings herein.

Turning to FIG. 2, the analytics system 100 includes a receiver 210 and a transceiver 220. The analytics system 100 of the illustrated example also includes a reference controller 232, a frame controller 234, a translation controller 236, an analytics controller 238, a recording database 240, a reference database 250, a 3D database 260, and an analytics database 270.

The receiver 210 of the illustrated example includes wired and/or wireless network interfaces to enable communication with external networks. The receiver 210 includes hardware (e.g., processors, memory, storage, antenna, etc.) and software to control the wired or wireless network interfaces. The receiver 210 is configured to receive a single video stream of a sporting event from the production-control computing system 30 via the network 40.

The frame controller 234 is configured to record the single video stream of the sporting event that was received by the receiver 210. The frame controller 234 stores data (e.g., an image, a time stamp, etc.) of frames of the video stream in the recording database 240. For example, each entry within the recording database 240 corresponds with a respective frame of the video stream and includes data of the respective frame.

The reference controller 232 is configured to generate (1) virtual three-dimensional renderings of fields-of-play and (2) other reference data (e.g., virtual images, camera settings corresponding with the virtual images, locations of static objects, etc.) associated with the virtual renderings for the fields-of-play. The frame controller 234 also is configured to store the generated data for the virtual renderings of fields-of-play in the reference database 250. For example, entries in the reference database 250 for a particular virtual rendering of a field-of-play includes a virtual image of the virtual rendering, a virtual camera setting at which the virtual image is captured, and two-dimensional coordinates of static feature(s) of the virtual rendering that are included in the virtual image.

The translation controller 236 is configured to translate frames of the single two-dimensional video stream into virtual three-dimensional field-of-play renderings. For example, the translation controller 236 is configured to initially identify one or more tracking sessions within the single video stream. For each frame within each tracking session of the video stream, the translation controller 236 is configured to identify a camera setting of a camera that captured the frame, locate object(s)-of-interest within the frame, and translate the object(s)-of-interest onto a virtual field-of-play rendering. In some examples, the translation controller 236 also is configured to track object(s)-of-interest between frames and/or interpolate positions of object(s)-of-interest that are outside the view of the respective camera. The translation controller 236 is configured to store data corresponding with frames of the virtual field-of-play rendering in the 3D database 260. For example, each entry in the 3D database 260 includes data for a virtual frame that corresponds with a respective frame of the single video stream.

The analytics controller 238 is configured to utilize the data stored in the 3D database 260 to analyze the corresponding sporting event. For example, the analytics controller 238 is configured to retrieve data from the 3D database 260 in order to generate a virtual video rendering of the sporting event and/or generate sports analytics for the sporting event. In order to generate the sports analytics for the sporting event, the analytics controller 238 is configured to identify characteristic(s)-of-interest for the sporting event, retrieve analytics program(s) for the characteristic(s)-of-interest that are stored in the analytics database 270, and apply the retrieved analytics program(s) to data that corresponding with the sporting event that is stored in the 3D database 260. In some examples, the analytics controller 238 stores the generated virtual video rendering and/or sports analytics in the analytics database 270.

The transceiver 220 of the illustrated example includes wired and/or wireless network interfaces to enable communication with external networks. The transceiver 220 includes hardware (e.g., processors, memory, storage, antenna, etc.) and software to control the wired or wireless network interfaces. The transceiver 220 is configured to communicate with the computing device 50 of the user 55 via the network 45. For example, the transceiver 220 is configured to receive requests for a virtual video rendering of a sporting event and/or sports analytics based on the sporting event. The transceiver 220 also is configured to transmit the requested virtual video rendering and/or sports analytics to the computing device 50 of the user 55 via the network 45. For example, the transceiver 220 is configured to transmit sports analytics to be viewed in the form of an email, via a browser-based portal, via an app-based portal, etc.

Figure 3:
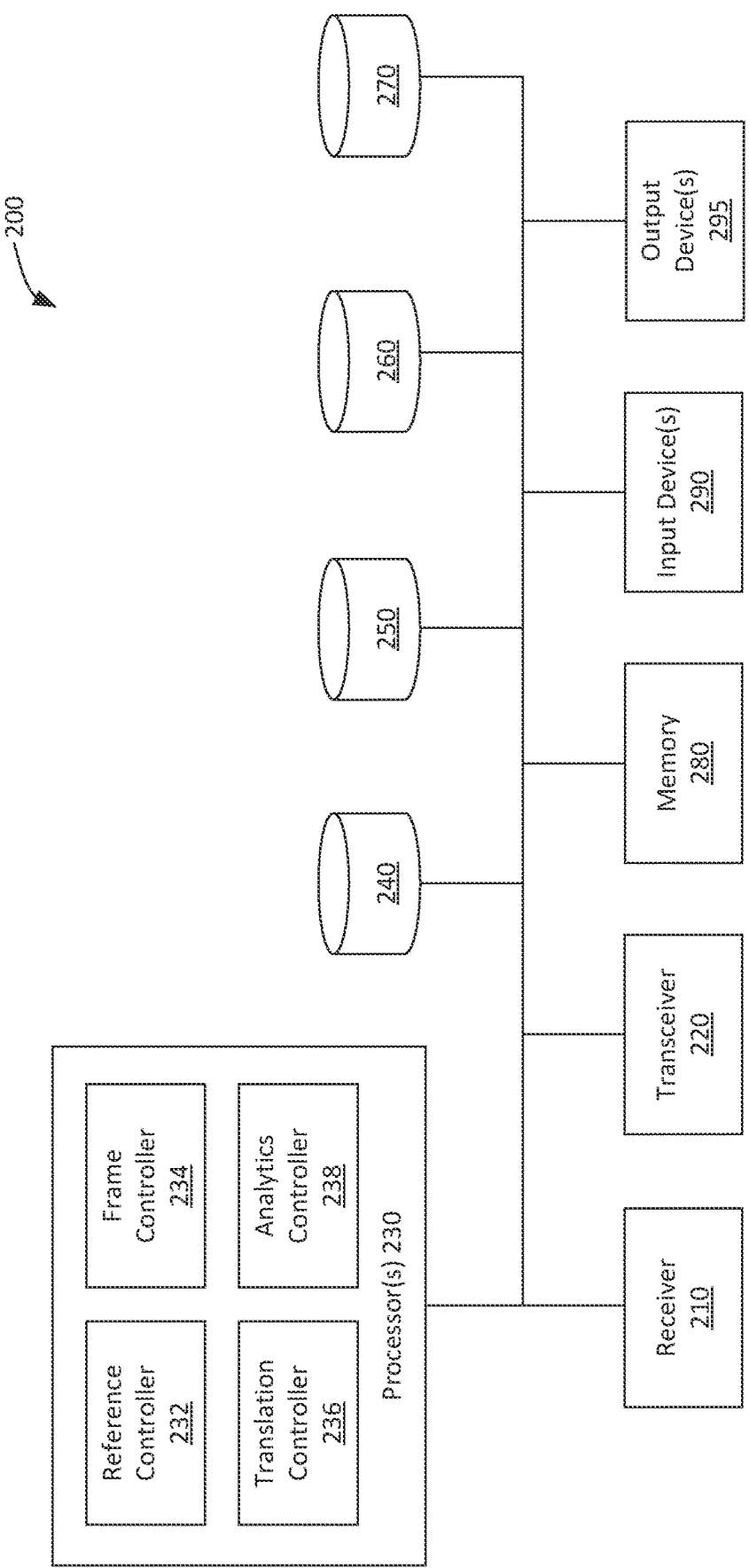
FIG. 3 is a block diagram of electronic components of the system of FIG. 2.

FIG. 3 is a block diagram of electronic components 200 of the analytics system 100. As illustrated in FIG. 3, the electronic components 200 include one or more processors 230. Further, the electronic components 200 include the receiver 210, the transceiver 220, the recording database 240, the reference database 250, the 3D database 260, the analytics database 270, memory 280, input device(s) 290, and output device(s) 295.

In the illustrated example, the processor(s) 230 are structured to include the reference controller 232, the frame controller 234, the translation controller 236, and the analytics controller 238. The processor(s) 230 of the illustrated example are any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The recording database 240, the reference database 250, the 3D database 260, and the analytics database 270 of the illustrated example reside in the memory 280. In some examples, the memory 280 is volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). Further, in some examples, the memory 280 includes multiple kinds of memory, particularly volatile memory and non-volatile memory.

The memory 280 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 280, the computer readable medium, and/or within the processor(s) 230 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the input device(s) 290 enable a user, such as an information technician of the analytics system 100, to provide instructions, commands, and/or data to the processor(s) 230. Examples of the input device(s) 290 include one or more of a button, a control knob, an instrument panel, a touch screen, a touchpad, a keyboard, a mouse, a speech recognition system, etc.

The output device(s) 295 of the illustrated example display output information and/or data of the processor(s) 230 to a user, such as an information technician of the analytics system 100. Examples of the output device(s) 295 include a liquid crystal display (LCD), an organic light emitting diode (OLED) display, a flat panel display, a solid state display, and/or any other device that visually presents information to a user. Additionally or alternatively, the output device(s) 295 may include one or more speakers and/or any other device(s) that provide audio signals for a user. Further, the output device(s) 295 may provide other types of output information, such as haptic signals.

FIGS. 4-12 depicts flowcharts of an example method 400 for mapping a two-dimensional video stream of a sporting event onto a virtual three-dimensional field-of-play rendering for sports analytics. The flowcharts of FIGS. 4-12 are representative of machine readable instructions that are stored in memory (such as the memory 280 of FIG. 3) and include one or more programs which, when executed by one or more processors (such as the processor(s) 230 of FIG. 3), cause the analytics system 100 to implement the example reference controller 232, the example frame controller 234, the example translation controller 236, and the example analytics controller 238 of FIGS. 2-3. While the example programs are described with reference to the flowcharts illustrated in FIGS. 4-12, many other methods of implementing the example reference controller 232, the example frame controller 234, the example translation controller 236, and/or the example analytics controller 238 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Figure 4:
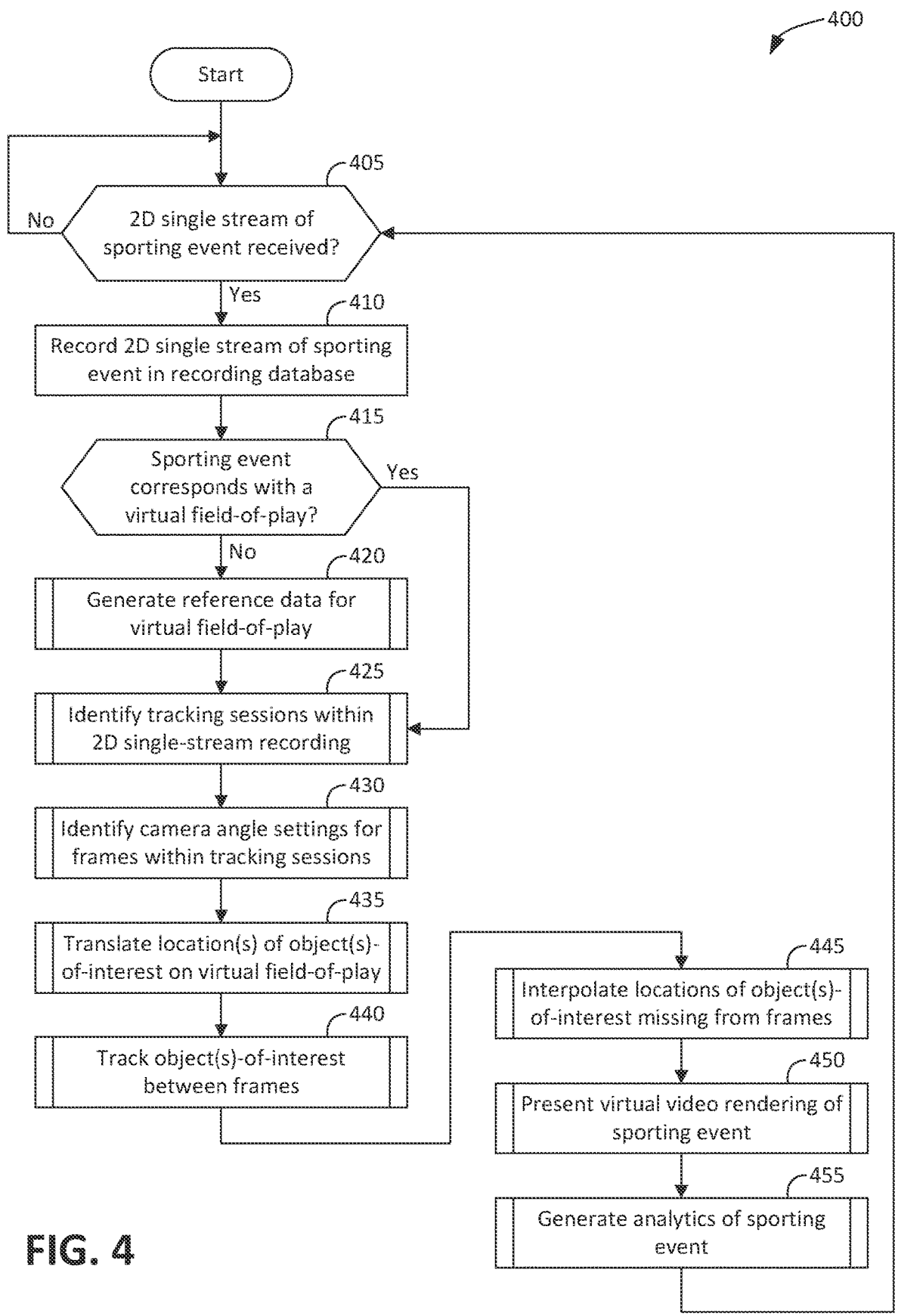
FIG. 4 represents a process for mapping a single two-dimensional video stream of a sporting event onto a virtual three-dimensional field-of-play rendering for sports analytics in accordance with the teachings herein.

Initially, at block 405 of FIG. 4, the frame controller 234 of the processor(s) 230 determines whether the receiver 210 has received a single two-dimensional video stream of a sporting event. In response to the frame controller 234 determining that the receiver 210 has not received a single video stream of a sporting event, the method 400 remains at block 405. Otherwise, in response to the frame controller 234 determining that the receiver 210 has received a single video stream of a sporting event, the method 400 proceeds to block 410 at which the frame controller 234 records the single video stream of the sporting event and stores the recording in the recording database 240.

At block 415, the frame controller 234 determines whether the sporting event is being played on a field-of-play for which a virtual field-of-play rendering has been previously generated. That is, the frame controller 234 determines whether the sporting event corresponds with a previously-generated virtual field-of-play. For example, sporting events for a particular sport are typically at a number of different fields-of-play each with potentially a number of unique characteristics. The reference controller 232 is configured to generate a respective virtual field-of-play rendering for any field-of-play on which a sporting event is played. In response to the frame controller 234 determining that the sporting event corresponds with a previously-generated virtual field-of-play, the method 400 proceeds to block 425. Otherwise, in response to the frame controller 234 determining that the sporting event does not correspond with a generated virtual field-of-play, the method 400 returns to block 420.

At block 420, the reference controller 232 of the processor(s) 230 generates reference data for a virtual rendering of a field-of-play. As disclosed below in greater detail, the virtual rendering generated by the reference controller 232 enables locations of objects on the field-of-play to be accurately identified within frames of a single two-dimensional video stream, thereby enabling sports analytics for a sporting event on the field-of-play 10 to be generated based on a single two-dimensional video stream.

Figure 5:
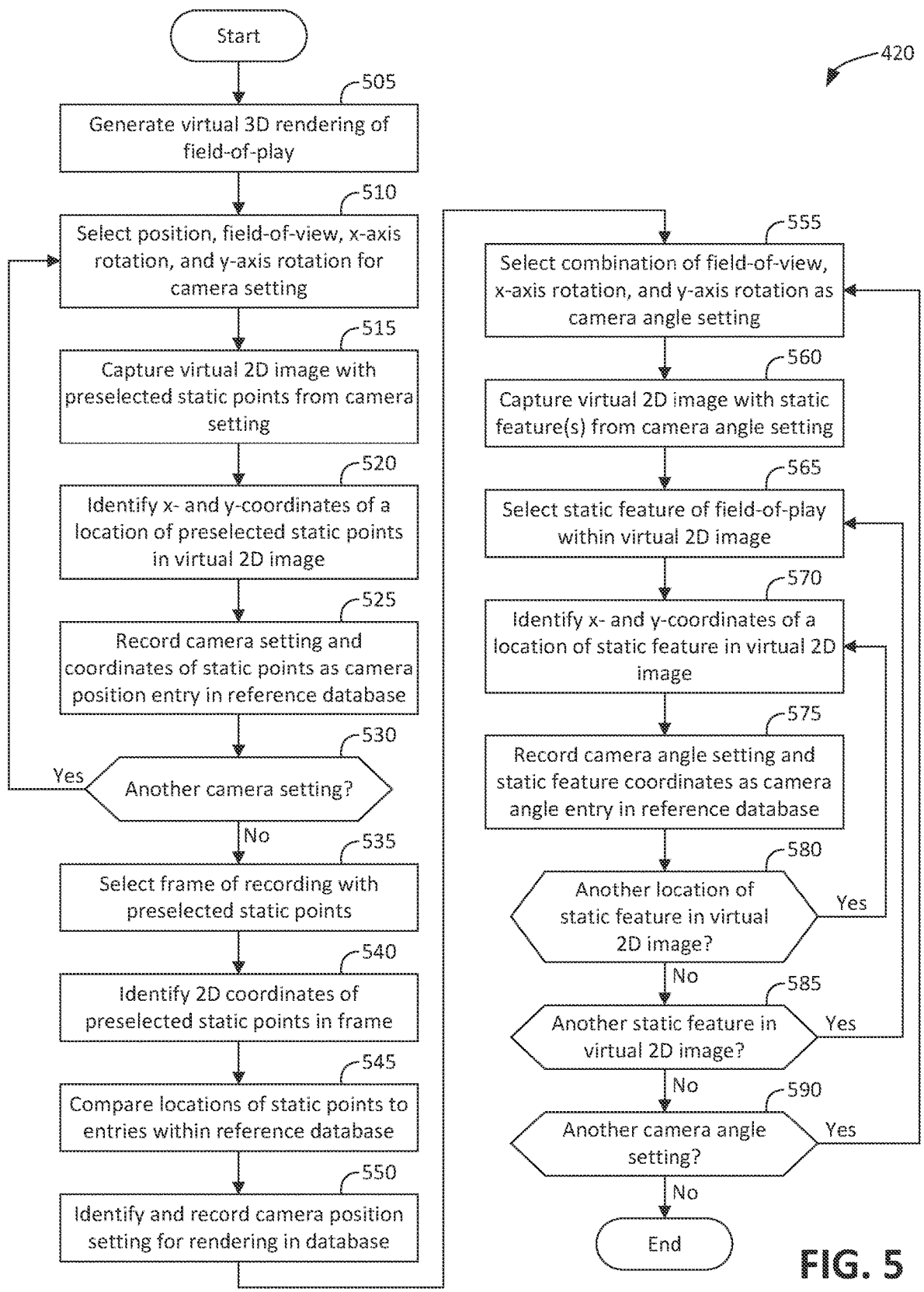
FIG. 5 represents a subprocess of the process of FIG. 4 for generating a reference database for the virtual three-dimensional field-of-play rendering.
Figure 13:
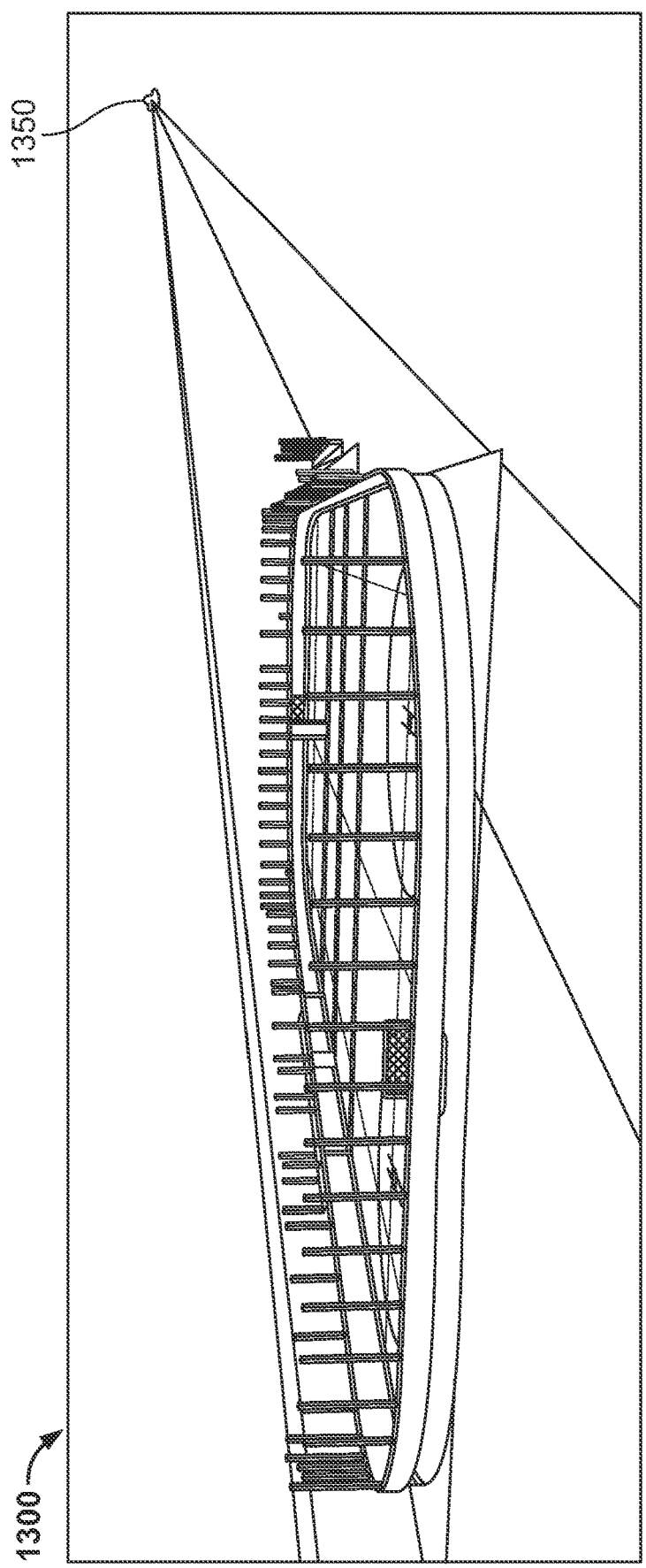
FIG. 13 depicts a virtual camera directed toward an example virtual three-dimensional field-of-play rendering in accordance with the teachings herein.

FIG. 5 is a flowchart that depicts an example method 420 for performing the block 405 of FIG. 4. Initially, at block 505, the reference controller 232 generates a virtual three-dimensional rendering of a physical field-of-play. For example, the reference controller 232 generates the virtual rendering using a three-dimensional development platform, such as Unity software of Unity Software Inc., that is typically used for three-dimensional gaming, animation, etc. FIG. 13 depicts a virtual rendering 1300 of the field-of-play 10. The virtual rendering 1300 includes the same dimensions, boundaries, lines, etc. as that of the field-of-play 10.

After the virtual rendering 1300 is generated, the reference controller 232 is to identify a virtual camera position setting for the virtual rendering 1300. The virtual camera position setting corresponds with a physical position of a physical camera that captures video of the field-of-play 10. Typically, for fields-of-play of major sporting events, the positions of the cameras 22, 24 are immobile and remain constant for different sporting events played on the same field-of-play 10. That is, the positions of the cameras 22, 24 for one sporting event on the field-of-play 10 typically are the same positions of the cameras 22, 24 for another sporting event on the same field-of-play 10. The reference controller 232 of the illustrated example analyzes the video of a single video stream of a sporting event on the field-of-play 10 and designates that position for the camera for all sporting events on the field-of-play 10. In some examples, the reference controller 232 performs a spot check at the beginning of analyzing a single video stream of another sporting event at the field-of-play to confirm that the position of the camera has not moved between sporting events.

Figure 14:
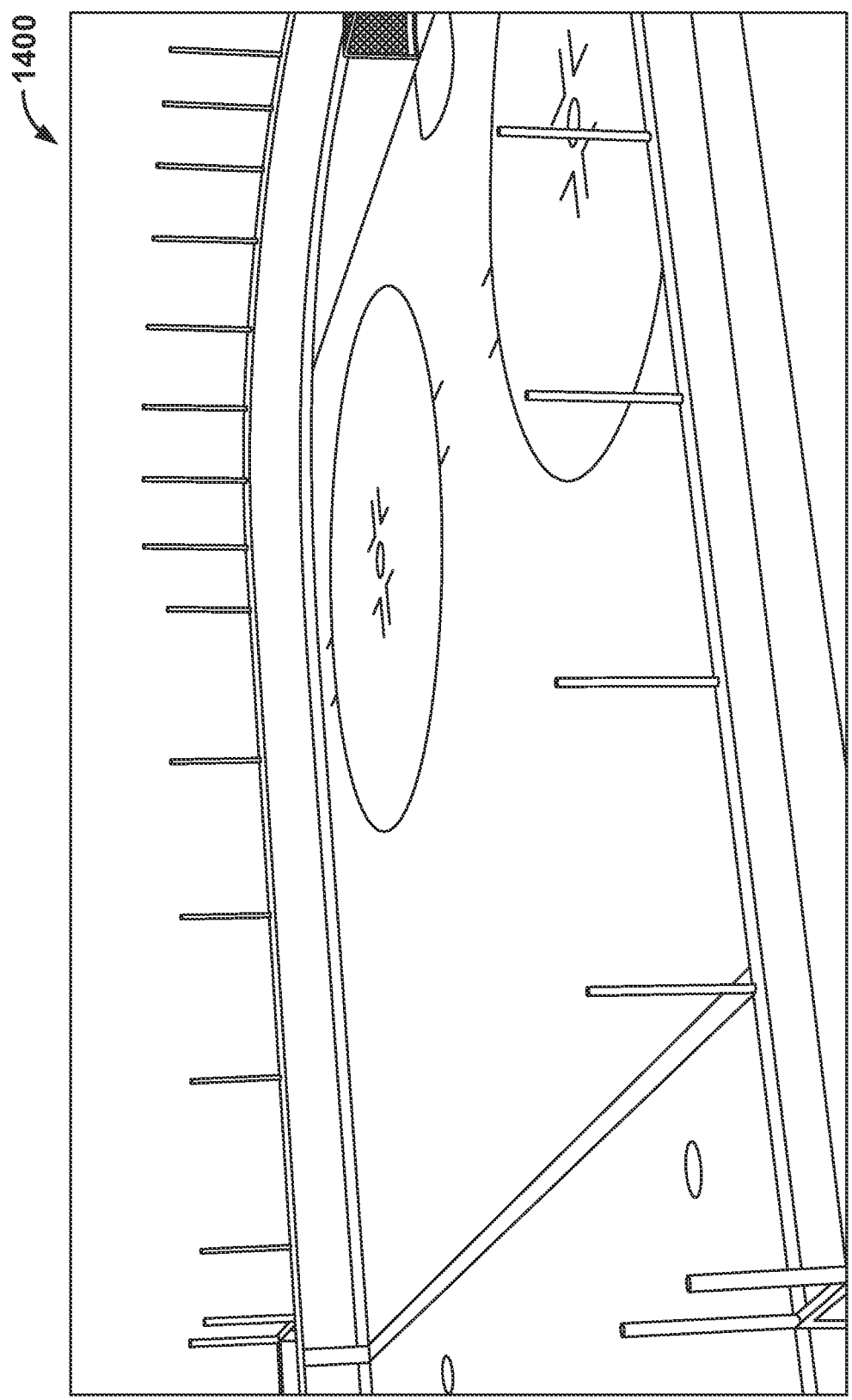
FIG. 14 depicts an image of the virtual three-dimensional field-of-play rendering captured from the perspective of a camera position setting.
Figure 15:
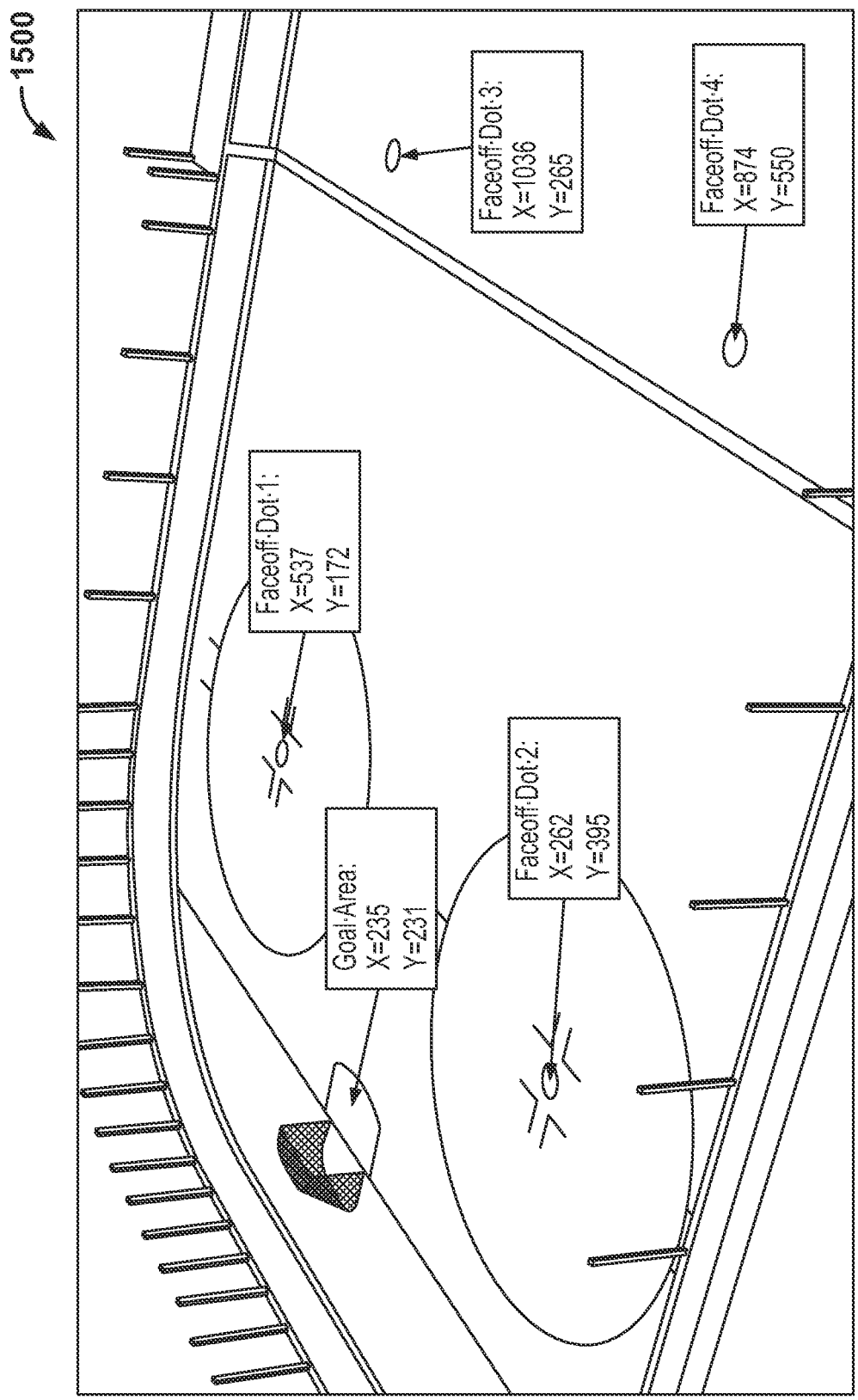
FIG. 15 depicts another image of the virtual three-dimensional field-of-play rendering captured from the perspective of the camera position setting of FIG. 14 with location information of key points of the field-of-play.

To identify the virtual camera position setting for the virtual rendering 1300, the reference controller 232 initially proceeds to block 510 to select a virtual camera setting from which a virtual camera 1350 (FIG. 13) is to capture a virtual image of the virtual rendering 1300. For example, the reference controller 232 uses the three-dimensional development platform (e.g., Unity software of Unity Software Inc.) to capture a screenshot of the virtual rendering 1300 for the virtual image. The virtual camera setting includes a position of the virtual camera 1350, as well as a field-of-view, an angle-of-view, an x-axis rotation, a y-axis rotation, and/or other characteristic(s). At block 515, the reference controller 232 captures a virtual two-dimensional image (e.g., using the three-dimensional development platform that generated the virtual rendering 1300) of the virtual rendering 1300 from the perspective of the virtual camera 1350 having the selected virtual camera setting. In some examples, to expedite processing times for the identification of the virtual camera position setting for the virtual rendering 1300, the reference controller 232 only captures the virtual two-dimensional image from the perspective of the virtual camera 1350 if the virtual image includes all of a preselected set of key points located on the virtual rendering 1300. Example virtual two-dimensional images of the virtual rendering 1300 with preselected static points of 4 face-off spots and a center-point of a goal-line include a virtual image 1400 of FIG. 14 and a virtual image 1500 of FIG. 15.

At block 520, the reference controller 232 identifies a combination of x- and y-coordinates of the preselected static points within the virtual image. For example, the x- and y-coordinates correspond with a particular pixel within a two-dimensional grid of pixels of the virtual image. At block 525, the reference controller 232 records the selected camera setting and the two-dimensional coordinates of the preselected static points as a camera position entry in the reference database 250.

At block 530, the reference controller 232 determines whether there is another virtual camera setting for which to create a camera position entry in the reference database 250. Each virtual camera setting includes a unique combination of location, x-axis rotation, a y-axis rotation, an angle-of-view, a field-of-view and/or other characteristic(s) of the virtual camera. In some examples, the reference database 250 includes large number of entries (e.g., thousands, tens of thousands, etc.) that correspond with different respective virtual camera settings. In other examples, the reference database 250 may include more or less camera position entries. The reference database 250 includes a large number of camera position entries to ensure the accurate identification of a camera position of a physical camera that captures a frame of the single two-dimensional video stream. In response to the reference controller 232 determining that there is another camera setting, the method 420 returns to block 510. Otherwise, in response to the reference controller 232 determining that there is not another camera setting, the method 420 proceeds to block 555.

At block 535, the reference controller 232 selects a frame within the single video stream of the sporting event, such as the frame 1600, that includes each of the preselected static points for the field-of-play 10. At block 540, the reference controller 232 identifies two-dimensional coordinates (e.g., x- and y-coordinates) of the preselected static points within the selected frame. For example, the coordinates include x- and y-coordinates that correspond with a particular pixel within a two-dimensional grid of pixels of the virtual image.

At block 545, the reference controller 232 compares the locations of the preselected static points within the selected frame to camera position entries within the reference database 250. The reference controller 232 compares the locations of the static points within the selected frame to camera position entries within the reference database 250 to identify an entry that matches the selected frame. As used herein, a "matching virtual camera position setting" refers to a camera position setting of an entry within a reference database whose location data of static points is most similar, relative to other entries in the database, to location data of static points in a frame of single video stream. By identifying a matching virtual camera position setting from within the reference database 250 for a frame within the single video stream, the reference controller 232 is able to identify the physical camera position of the physical camera that captured the frame of the single video stream.

To identify the matching entry, the reference controller 232 selects camera position entries within the reference database 250 that include the preselected static points. For each virtual camera position setting within the reference database 250 that has those static points, the reference controller 232 compares the locations of each preselected static point within the selected frame to the locations of each preselected static point of the virtual camera position setting.

For example, for each preselected static point of a virtual camera position setting, the reference controller 232 calculates a difference between the position of preselected static point within the selected frame compared to the position of preselected static point of virtual camera position setting. The reference controller 232 sums the calculated differences for each of the preselected static points together to calculate a comparison score. The reference controller 232 calculates a comparison score for each of the camera position entries within the reference database 250 that include the preselected static points. The reference controller 232 selects the camera position entry with the lowest comparison score as the matching entry.

At block 550, the reference controller 232 identifies and records the virtual camera position setting for the virtual rendering. For example, the reference controller 232 selects the camera position entry within the reference database 250 that includes the identified y-orientation value, field-of-view, and x-orientation value. The reference controller selects the position value of the matching position entry as the virtual camera position setting of the virtual rendering 1300. The reference controller 232 records the identified camera position setting for the virtual rendering 1300 in the reference database 250 and/or the 3D database 260.

The reference controller 232 proceeds to block 555 to create a camera angle entry of the reference database 250 for the virtual rendering 1300. Each camera angle entry corresponds with a particular camera angle setting of a camera at the camera position setting associated with the virtual rendering 1300. A virtual camera angle setting corresponds with a combination of a field-of-view, an angle-of-view, an x-axis rotation, a y-axis rotation, and/or other characteristic(s) of a camera at the camera position setting.

As provided below in greater detail, virtual camera angle settings of the reference database 250 are used to identify a camera angle setting of a physical camera for particular frames within a single video stream. The reference controller 232 separately generates camera position entries for identification of the camera position setting of a physical camera and camera angle entries for identification of camera angle settings of the physical camera to reduce the amount of processing needed to identify camera settings of a physical camera. For example, because a physical camera for the field-of-play 22 is stationary, the position of the physical camera does not need to be repeatedly determined for different frames within a single video stream of a sporting event of the field-of-play 10. Once the position of the camera is determined for one frame of the field-of-play 10, the position of the camera can be assumed to remain constant throughout the sporting event. By determining the virtual camera position setting for the virtual rendering 1300 before generating the camera angle entries for the virtual rendering 1300, the reference controller 232 is able to identify the virtual camera position setting as a constant for the virtual rendering 1300 and, thus, reduce the amount of data generated and processed for identifying the virtual camera angle setting. In some examples, the number of camera position entries within the reference database 250 is significantly less than the camera angle entries within the reference database 250 as a result of the camera angle setting needing to be more granular in order to accurately identify a camera angle setting of a camera.

Figure 17:
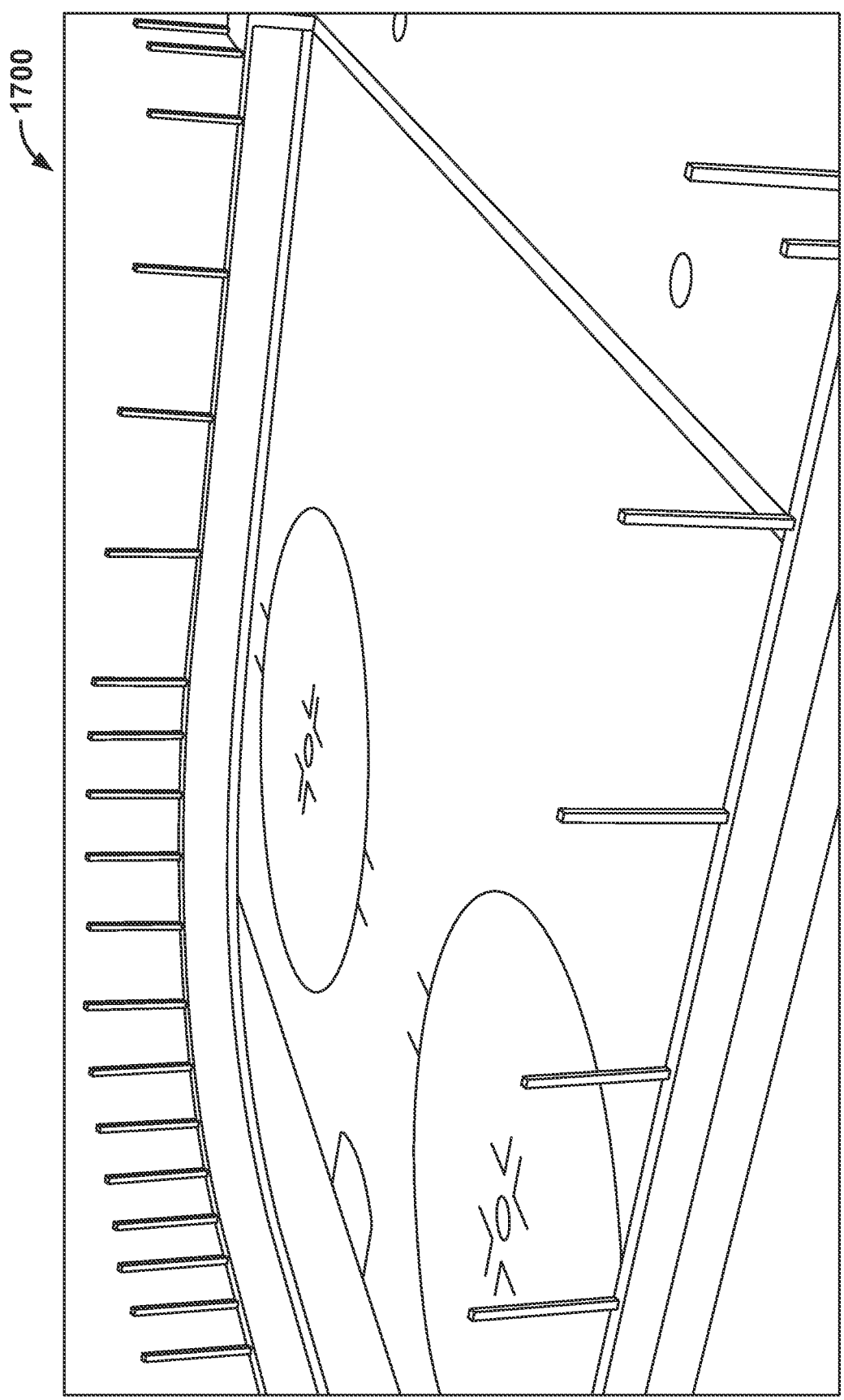
FIG. 17 depicts another image of the virtual three-dimensional field-of-play rendering captured from a perspective of a camera angle setting at the camera position setting of FIG. 14.

Returning to FIG. 5, the reference controller 232 proceeds to block 560 to select a virtual camera angle setting for the previously-identified virtual camera position setting from which the virtual camera 1350 (FIG. 13) is to capture a virtual image of the virtual rendering 1300. For example, the reference controller 232 uses the three-dimensional development platform (e.g., Unity software of Unity Software Inc.) to capture a screenshot of the virtual rendering 1300 for the virtual image. The virtual camera angle setting includes a field-of-view, an angle-of-view, an x-axis rotation, a y-axis rotation, and/or other characteristic(s). At block 560, the reference controller 232 captures a virtual two-dimensional image (e.g., using the three-dimensional development platform that generated the virtual rendering 1300) of the virtual rendering 1300 from the perspective of the virtual camera 1350 having the selected virtual camera angle setting and the identified virtual camera position setting of the virtual rendering 1300. Example virtual two-dimensional images of the virtual rendering 1300 of the field-of-play 10 include a virtual image 1400 of FIG. 14, a virtual image 1500 of FIG. 15, and a virtual image 1700 of FIG. 17. For example, the camera angle setting of the virtual image 1700 includes an x-axis rotation of 15, a y-axis rotation of 225, and a field-of-view of 12.5.

At block 565, the reference controller 232 selects a static feature of the virtual rendering 1300 of the field-of-play 10 that is captured within the virtual image taken at block 560. At block 570, the reference controller 232 identifies a combination of x- and y-coordinates of the selected static feature within the virtual image. For example, the x- and y-coordinates correspond with a particular pixel within a two-dimensional grid of pixels of the virtual image. At block 575, the reference controller 232 records the selected camera angle setting and the two-dimensional coordinates of the selected static feature as a camera angle entry in the reference database 250.

Figure 18:
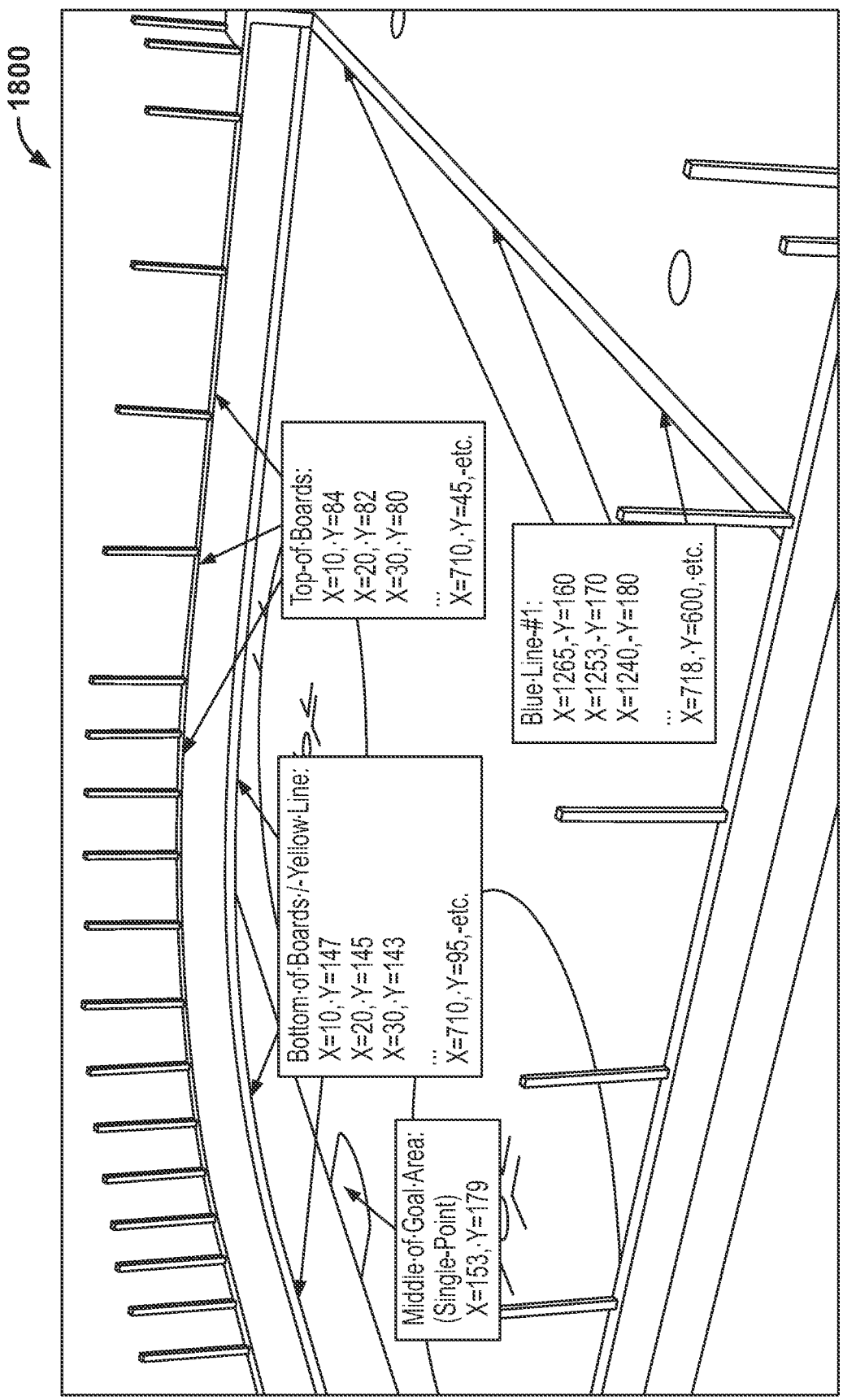
FIG. 18 depicts the image of FIG. 17 with location information of a plurality of key features of the field-of-play.

At block 580, the reference controller 232 determines whether there is another location of the selected static feature within the selective virtual image. Static feature may extend along a plurality of different coordinates within the virtual image. For example, FIG. 18 depicts sets of two-dimensional coordinates for a plurality of static objects that are identified by the reference controller 232 within the virtual image 1700. As shown in FIG. 18, a top edge of the boards, a bottom edge of the boards (e.g., the "yellow line"), a blue line, and a goal area each have multiple identifiable two-dimensional coordinates. Example camera angle entries in the reference database 250 at a selected camera angle setting for a particular static object are provided below in Table 1:

TABLE 1

| Field of View | Rotation X | Rotation Y | Line Type | X-Coordinate | Y-Coordinate |
|---|---|---|---|---|---|
| 14.5 | 15 | 158.25 | Blue Line | 1286 | 190 |
| 14.5 | 15 | 158.25 | Blue Line | 1278 | 200 |
| 14.5 | 15 | 158.25 | Blue Line | 1270 | 210 |
| 14.5 | 15 | 158.25 | Blue Line | 1261 | 220 |
| 14.5 | 15 | 158.25 | Blue Line | 1253 | 230 |
| 14.5 | 15 | 158.25 | Blue Line | 1244 | 240 |
| 14.5 | 15 | 158.25 | Blue Line | 1234 | 250 |
| 14.5 | 15 | 158.25 | Blue Line | 1226 | 260 |
| 14.5 | 15 | 158.25 | Blue Line | 1217 | 270 |
| 14.5 | 15 | 158.25 | Blue Line | 1209 | 280 |
| 14.5 | 15 | 158.25 | Blue Line | 1199 | 290 |
| 14.5 | 15 | 158.25 | Blue Line | 1191 | 300 |
| 14.5 | 15 | 158.25 | Blue Line | 1182 | 310 |
| 14.5 | 15 | 158.25 | Blue Line | 1173 | 320 |
| 14.5 | 15 | 158.25 | Blue Line | 1163 | 330 |
| 14.5 | 15 | 158.25 | Blue Line | 1156 | 340 |
| 14.5 | 15 | 158.25 | Blue Line | 1147 | 350 |
| 14.5 | 15 | 158.25 | Blue Line | 1138 | 360 |
| 14.5 | 15 | 158.25 | Blue Line | 1129 | 370 |
| 14.5 | 15 | 158.25 | Blue Line | 1120 | 380 |
| 14.5 | 15 | 158.25 | Blue Line | 1112 | 390 |
| 14.5 | 15 | 158.25 | Blue Line | 1103 | 400 |
| 14.5 | 15 | 158.25 | Blue Line | 1094 | 410 |
| 14.5 | 15 | 158.25 | Blue Line | 1085 | 420 |
| 14.5 | 15 | 158.25 | Blue Line | 1076 | 430 |
| 14.5 | 15 | 158.25 | Blue Line | 1068 | 440 |
| 14.5 | 15 | 158.25 | Blue Line | 1059 | 450 |
| 14.5 | 15 | 158.25 | Blue Line | 1050 | 460 |
| 14.5 | 15 | 158.25 | Blue Line | 1041 | 470 |
| 14.5 | 15 | 158.25 | Blue Line | 1032 | 480 |
| 14.5 | 15 | 158.25 | Blue Line | 1024 | 490 |
| 14.5 | 15 | 158.25 | Blue Line | 1015 | 500 |
| 14.5 | 15 | 158.25 | Blue Line | 1006 | 510 |
| 14.5 | 15 | 158.25 | Blue Line | 997 | 520 |
| 14.5 | 15 | 158.25 | Blue Line | 989 | 530 |
| 14.5 | 15 | 158.25 | Blue Line | 980 | 540 |
| 14.5 | 15 | 158.25 | Blue Line | 971 | 550 |
| 14.5 | 15 | 158.25 | Blue Line | 962 | 560 |
| 14.5 | 15 | 158.25 | Blue Line | 954 | 570 |
| 14.5 | 15 | 158.25 | Blue Line | 945 | 580 |
| 14.5 | 15 | 158.25 | Blue Line | 936 | 590 |
| 14.5 | 15 | 158.25 | Blue Line | 929 | 600 |
| 14.5 | 15 | 158.25 | Blue Line | 920 | 610 |
| 14.5 | 15 | 158.25 | Blue Line | 911 | 620 |
| 14.5 | 15 | 158.25 | Blue Line | 902 | 630 |
| 14.5 | 15 | 158.25 | Blue Line | 893 | 640 |
| 14.5 | 15 | 158.25 | Blue Line | 884 | 650 |
| 14.5 | 15 | 158.25 | Blue Line | 875 | 660 |
| 14.5 | 15 | 158.25 | Blue Line | 866 | 670 |
| 14.5 | 15 | 158.25 | Blue Line | 858 | 680 |
| 14.5 | 15 | 158.25 | Blue Line | 849 | 690 |
| 14.5 | 15 | 158.25 | Blue Line | 840 | 700 |
| 14.5 | 15 | 158.25 | Blue Line | 831 | 710 |

In response to the reference controller 232 determining that there is another location of the selected static feature within the selective virtual image, the method 420 returns to block 570. Otherwise, in response to the reference controller 232 determining that there is not another location of the selected static feature within the selective virtual image, the method 420 proceeds to block 585.

At block 585, the reference controller 232 determines whether there is another static feature within the selected virtual image. Virtual images of a virtual rendering 1300 may include a plurality of static features. For example, each of the example virtual images 1400, 1500, 1700 includes multiple static features, such as boards with upper and lower edges, goal areas, blue lines, a center line, face-off spots, etc. In response to the reference controller 232 determining that there is another static feature within the selected virtual image, the method 420 returns to block 565. Otherwise, in response to the reference controller 232 determining that there is not another static feature within the selected virtual image, the method 420 proceeds to block 590.

At block 590, the reference controller 232 determines whether there is another virtual camera angle setting for which to create a camera angle entry in the reference database 250. Each virtual camera angle includes a unique combination of x-axis rotation, a y-axis rotation, an angle-of-view, a field-of-view and/or other characteristic(s) of the virtual camera. In some examples, the reference database 250 includes large number of entries (e.g., thousands, tens of thousands, millions, etc.) that correspond with different respective virtual camera angle settings at the previously-identified virtual camera position setting. In other examples, the reference database 250 may include more or less camera angle entries. The reference database 250 includes a large number of camera angle entries to ensure the accurate identification of a camera angle setting of a physical camera that captures a frame of the single two-dimensional video stream. In response to the reference controller 232 determining that there is another camera angle setting, the method 420 returns to block 555. Otherwise, in response to the reference controller 232 determining that there is not another camera angle setting, the method 420 ends.

Returning to FIG. 4 at block 425, the translation controller 236 of the processor(s) 230 identifies one or more tracking sessions within the single two-dimensional video stream that has been recorded. As disclosed below in greater detail, the translation controller 236 identifies the tracking sessions within the video stream in order to identify which frames of the single video stream can be compared to the reference data stored within the reference database 250 and, in turn, determine respective camera angle settings associated with those frames. For example, frames of a tracking session include one or more static features that are used to identify the respective camera angle settings of physical cameras that captured those frames. Example frames outside of a tracking session include frames (e.g., close-ups, crowd shots, etc.) without a static feature that enables identification of the respective camera angle settings.

Figure 6:
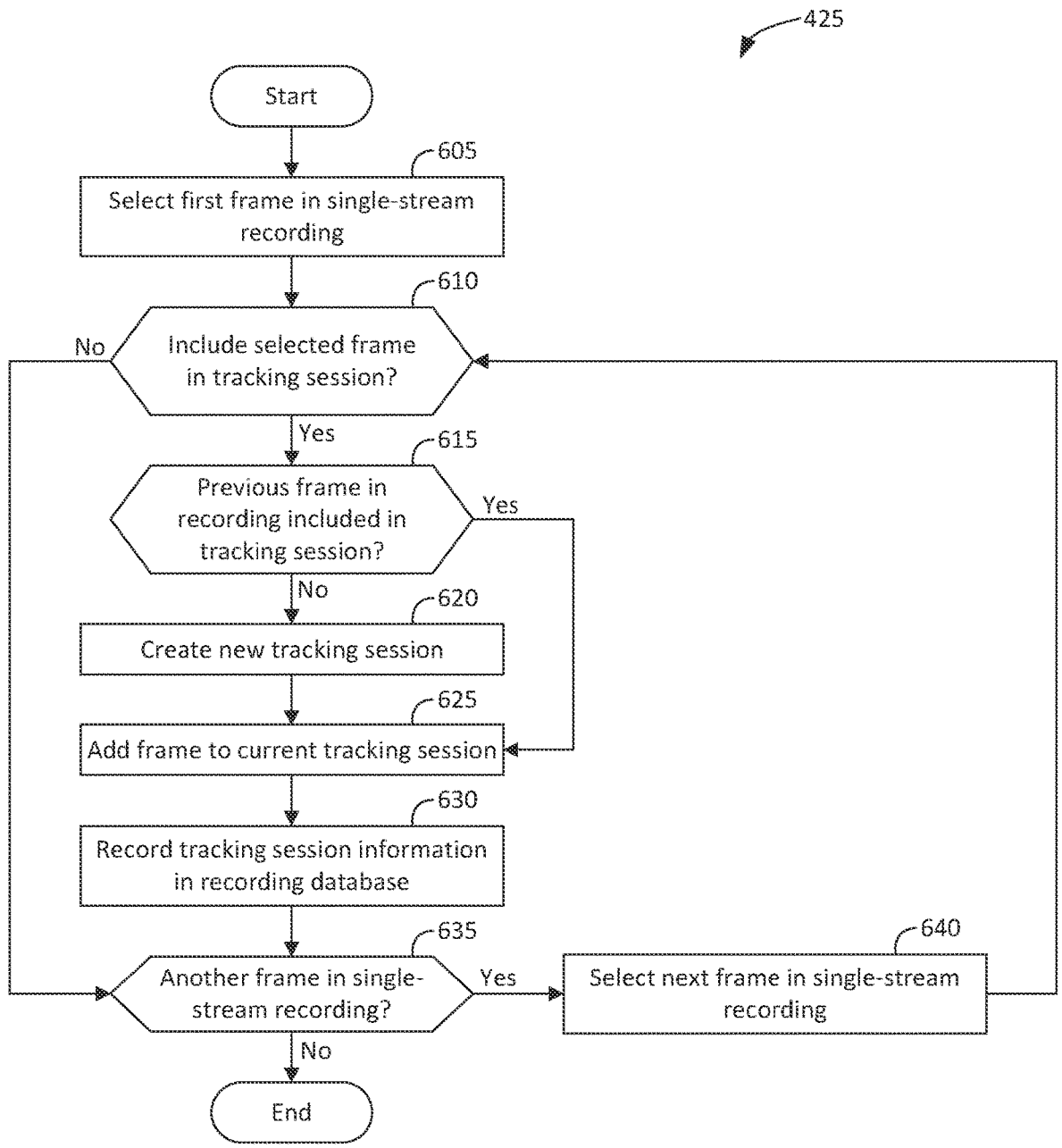
FIG. 6 represents a subprocess of the process of FIG. 4 for identifying tracking sessions within the single two-dimensional video stream.
Figure 16:
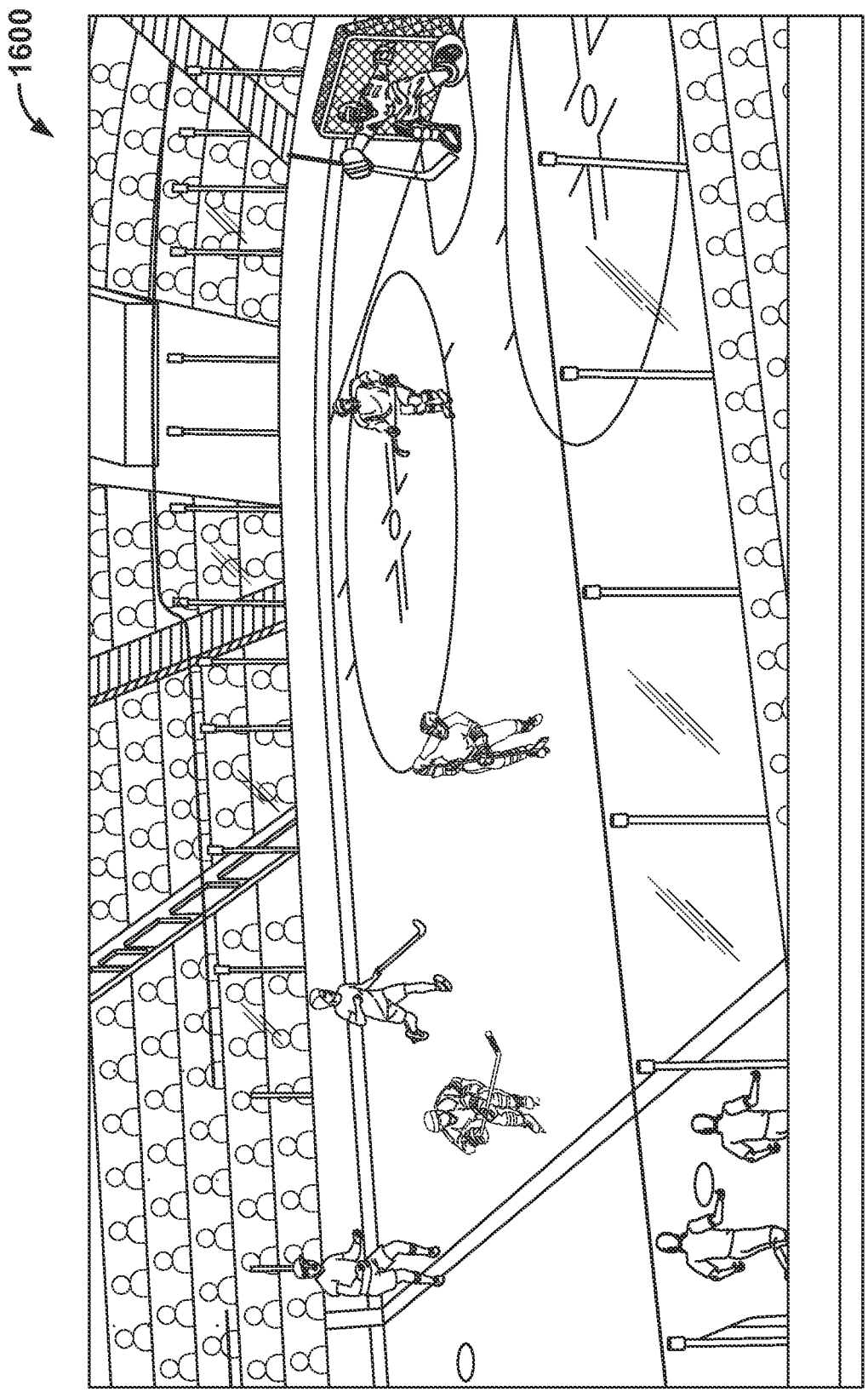
FIG. 16 depicts a frame of an example single two-dimensional video stream in accordance with the teachings herein.
Figure 19:
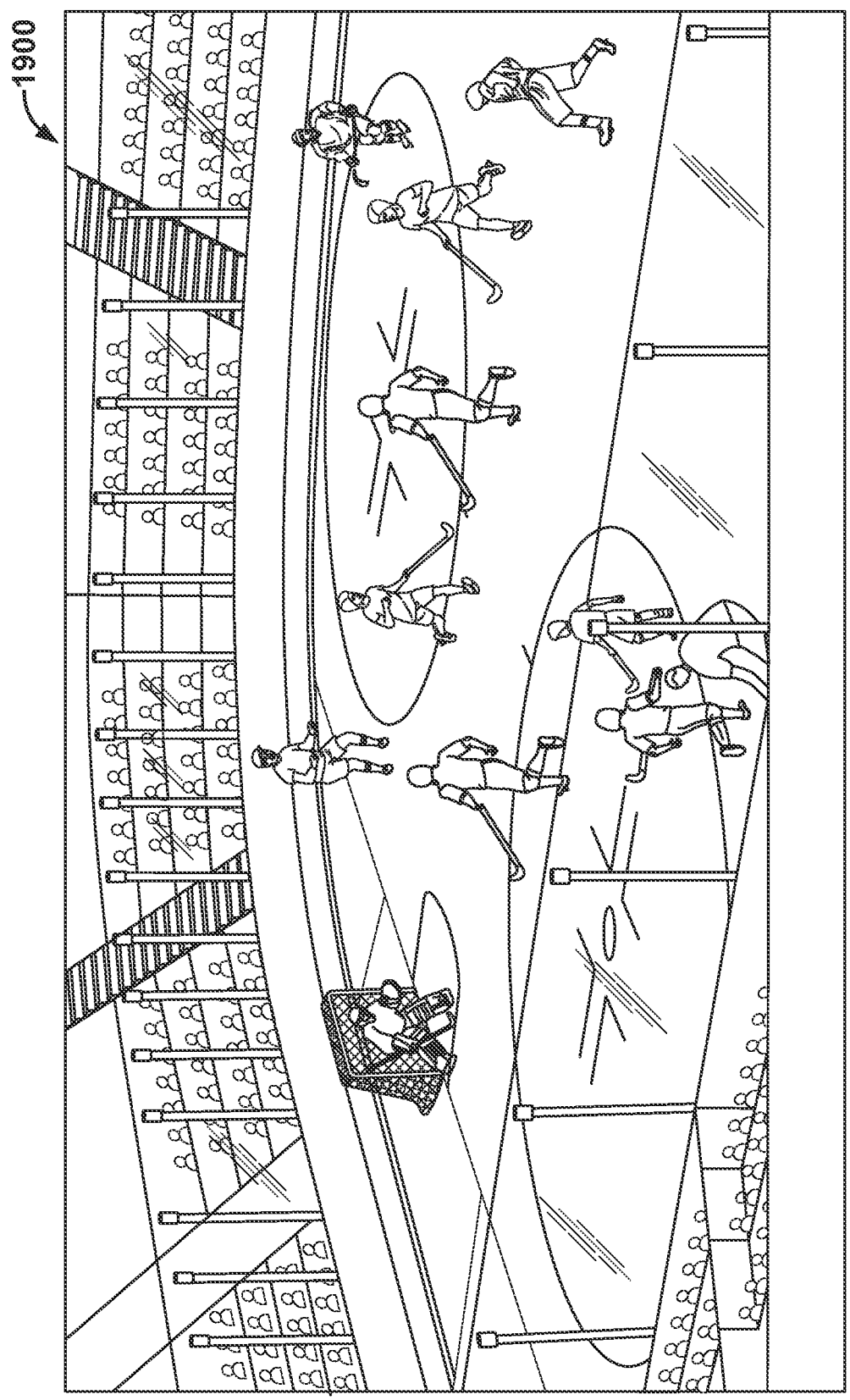
FIG. 19 depicts another frame of an example single two-dimensional video stream in accordance with the teachings herein.

FIG. 6 is a flowchart that depicts an example method 425 for performing the block 425 of FIG. 4. Initially, at block 605, the frame controller 234 selects the first frame within the recorded single video stream of the sporting event. Example frames 1600, 1900 of recorded single video streams are depicted in FIGS. 16 and 19, respectively. Returning to FIG. 6, at block 610, the frame controller 234 whether to include the selected frame in a tracking session. The frame controller 234 uses image recognition algorithm(s), point-clustering algorithm(s), machine learning algorithm(s), and/or other type(s) of algorithm(s) to identify static objects within a frame and determines whether to include the selected frame in a tracking session based on the identification of the static objects. Image-recognition algorithms are configured to detect and/or locate object(s) within an image. Some image-recognition algorithms include machine learning algorithms, which are a form of artificial intelligence (AI) that enable a computer system to automatically learn and improve over time based on previous performances without being explicitly programmed by a programmer for a particular function. Example artificial intelligence algorithms used for image recognition include convolutional neural networks and, more generally, convolutional neural networks.

In some examples, the frame controller 234 determines to include the selected frame in a tracking session upon identifying one or more static objects within the selected frame. In other examples, the frame controller 234 determines to include the selected frame in a tracking session upon locating one or more static objects within the selected frame, comparing the locations of those static objects to camera angle entries within the reference database 250, and identifying that one of the camera angle entries matches with the selected frame.

In response to the frame controller 234 determining not to include the selected frame in a training session, the method 425 proceeds to block 635. Otherwise, in response to the frame controller 234 determining to include the selected frame in a training session, the method 425 proceeds to block 615.

At block 615, the frame controller 234 determines whether the previous frame within the recorded single video stream is included in a tracking session. In response to the frame controller 234 determining that the previous frame is in a tracking session, the method 425 proceeds to block 625 at which the frame controller 234 adds the selected frame to the current tracking session that also includes the preceding frame. Otherwise, in response to the frame controller 234 determining that the previous frame is not in a tracking session, the method 425 proceeds to block 620 at which the frame controller 234 creates a new tracking session. Subsequently, at block 625, the frame controller 234 adds the selected frame to the newly-created tracking session. At block 630, the frame controller 234 records the tracking session information within the entry of the recording database 240 that corresponds with the selected frame.

At block 635, the frame controller 234 determines whether there is another frame in the recorded single video stream. In response to the frame controller 234 determining that there is not another frame, the method 425 ends. Otherwise, in response to the frame controller 234 determining that there is another frame, the method 425 proceeds to block 640 at which the frame controller 234 selects the next frame in the recorded single video stream. Upon completion of block 640, the method 425 returns to block 610.

Returning to FIG. 4, after the translation controller 236 identifies the tracking sessions at block 425, the method proceeds to block 430 at which the translation controller 236 identifies physical camera angle settings for frames within the tracking sessions. For example, for each frame of the single video stream within one of the tracking sessions, the translation controller 236 identifies an x-axis rotation, a y-axis rotation, an angle-of-view, a field-of-view and/or other characteristics of the physical camera that captured the frame of the single video stream. As disclosed below in greater detail, identification of a physical camera angle setting for a respective frame enables the translation controller 236 to accurately translate a two-dimensional location of an object within a frame of the single video stream into a three-dimensional location on the virtual three-dimensional rendering.

Figure 7:
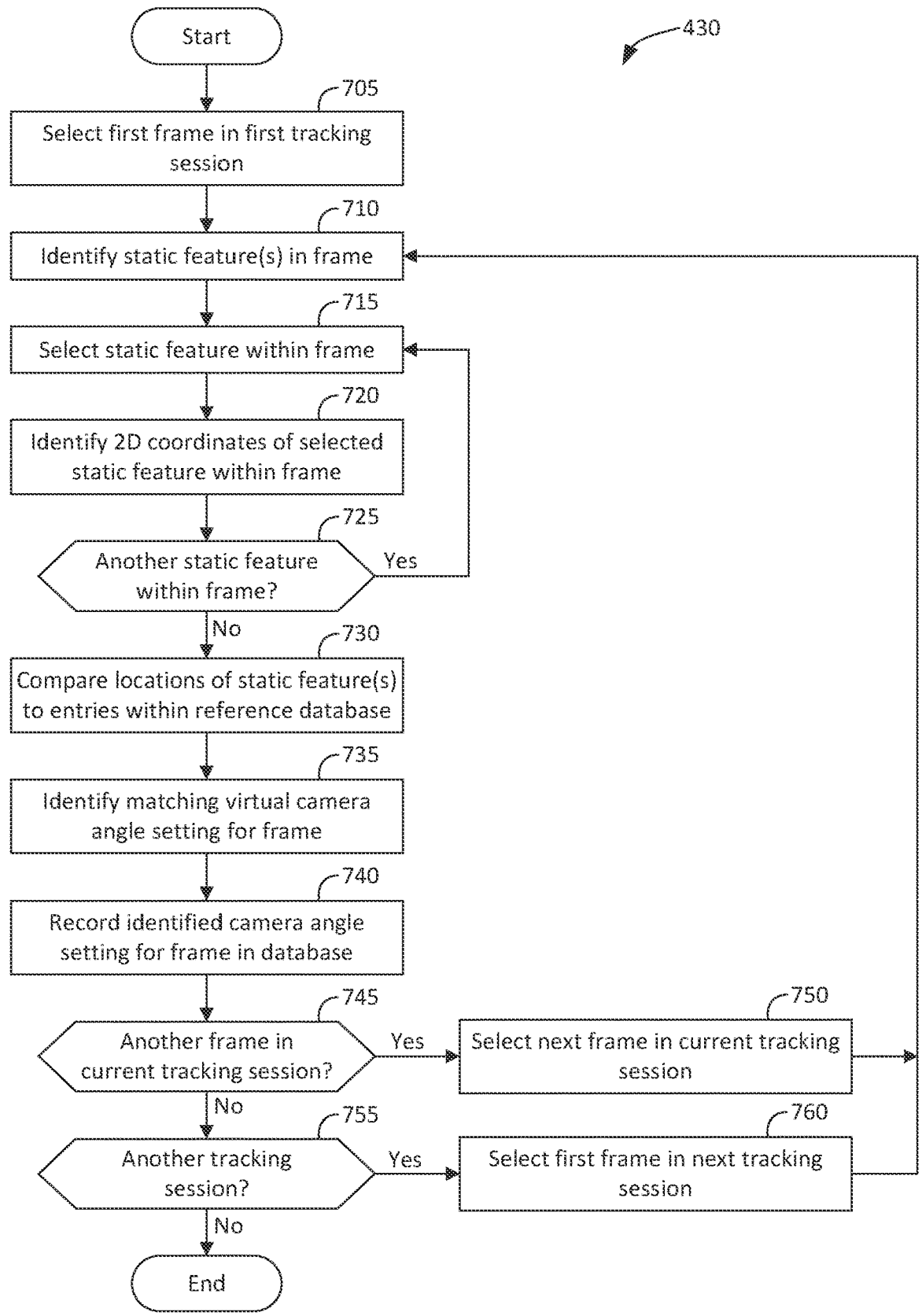
FIG. 7 represents a subprocess of the process of FIG. 4 for identifying camera angle settings for frames within the tracking sessions.

FIG. 7 is a flowchart that depicts an example method 430 for performing the block 430 of FIG. 4. Initially, at block 705, the translation controller 236 selects the first frame within the first tracking session of the single video stream. The example frames 1600, 1900 are included in tracking session(s) of a recorded single video stream. Returning to FIG. 7, at block 710, the translation controller 236 identifies one or more static features of the field-of-play 10 within the selected frame. For example, the translation controller 236 uses image recognition algorithm(s), point-clustering algorithm(s) (e.g., a color-based point-clustering algorithm), machine learning algorithm(s) (e.g., You Only Look Once or "YOLO" software), and/or other type(s) of algorithm(s) to identify static object(s) within the selected frame.

At block 715, the translation controller 236 selects one of the static feature(s) (e.g., an upper edge of the boards) identified within the selected frame. At block 720, the translation controller 236 identifies two-dimensional coordinates (e.g., x- and y-coordinates) of the selected static feature within the selected frame. For example, the coordinates include x- and y-coordinates that correspond with a particular pixel within a two-dimensional grid of pixels of the virtual image. Example static features within the virtual image 1700 of the field-of-play 10 extend along a plurality of different continuous two-dimensional coordinates. FIG. 19 includes at least two static features, namely upper and lower edges of the boards, for which x- and y-coordinates are identified by the translation controller 236.

Returning to FIG. 7, at block 725, the translation controller 236 determines whether there is another identified object to selected within the selected frame. In response to the translation controller 236 determining that there is another identified object, the method 430 returns to block 715. Otherwise, in response to the translation controller 236 determining that there is not another identified object, the method 430 proceeds to block 730.

At block 730, the translation controller 236 compares the locations of the static feature(s) within the selected frame to camera angle entries within the reference database 250. The translation controller 236 compares the locations of the static feature(s) within the selected frame to camera angle entries within the reference database 250 to identify an entry that matches the selected frame. As used herein, a "matching virtual camera angle setting" refers to a camera angle setting of an entry within a reference database whose location data of static objects is most similar, relative to other entries in the database, to location data of static objects in a frame of single video stream. By identifying a matching virtual camera angle setting from within the reference database 250 for a frame within the single video stream, the translation controller 236 is able to identify the physical camera angle setting of the physical camera that captured the frame of the single video stream.

For example, to identify the matching entry, the translation controller 236 identifies which static features are present in the selected frame and selects camera angle entries within the reference database 250 that include the same static features as that of the selected frame. For each virtual camera angle setting within the reference database 250 that has the static features of the selected frame, the translation controller 236 compares the locations of each identified static feature within the selected frame to the locations of each identified static feature to identify characteristics (e.g., a y-orientation value, an x-orientation value, a field-of-view value, etc.) for a matching virtual camera angle setting.

In some examples, the translation controller 236 analyzes one pixel for every predetermined number of pixels (e.g., one pixel for every 10 pixels) to expedite processing of the selected frame. Further, in some examples, the translation controller 236 assumes that (i) the y-rotation value remains constant for static features that extend substantially horizontally across a frame (e.g., upper and lower edges of boards) and/or (ii) the x-rotation value remains constant for static features that extend substantially vertically through a frame (e.g., blue lines). In turn, the translation controller 236 reduces the number of values to be determined, thereby reducing processing time for the matching sequence.

In some examples, the translation controller 236 selects one pixel for every predetermined number of pixels for each of the static features within the selected frame. The translation controller 236 also selects a field-of-view value as a constant. For example, the translation controller 236 selects the average field-of-view value stored within the reference database 250 for the field-of-view value of the matching virtual camera angle setting. For each selected pixel of the selected static feature(s), the translation controller 236 calculates a difference between the position of the pixel within the selected frame compared to the nearest position of the corresponding static feature within a camera angle entry of the reference database 250. In some examples, the translation controller 236 only conducts an x-value comparison for static features that extend substantially horizontally and only conducts a y-value comparison for static features that extend substantially vertically. The reference controller 232 sums the calculated differences for each pixel of a static feature together to calculate a feature score for that static feature. The reference controller 232 sums the feature score for each of the static feature(s) together to calculate a comparison score for each of the camera angle entries within the reference database 250. The reference controller 232 selects the camera angle entry with the lowest comparison score as the matching entry.

In other examples, the translation controller 236 determines characteristics of the matching virtual camera angle setting sequentially one-at-a-time in a manner that reduces processing time for the matching sequence. For example, the translation controller 236 determines (i) the y-orientation value, the field-of-view value, and the x-orientation value sequentially in order for static features that extend substantially horizontally across a frame (e.g., upper and lower edges of boards) and (ii) the x-orientation value, the field-of-view value, and the y-orientation value sequentially in order for static features that extend substantially vertically through a frame (e.g., blue lines).

For example, to compare locations of static feature(s) that extend substantially horizontally, the translation controller 236 determines a y-orientation value, a field-of-view value, and a x-orientation value sequentially in order. To initially determine the y-orientation value, the translation controller 236 compares the difference between the y-coordinate value of the selected frame to that of a virtual camera angle setting selected from the reference database 250 for each x-coordinate value of a particular static feature. Subsequently, after comparing the locations of each static feature, the translation controller 236 determines values that represent the overall difference between the selected frame and respective virtual camera angle settings selected from the reference database 250. The y-orientation value with the lowest overall difference is selected by the translation controller 236.

For example, to determine the field-of-view value, the translation controller 236 compares the average distance between two or more static features. The translation controller 236 determines the average distance between the bottom and top edges of the board (i.e., the height of the boards) within the selected frame to that of each virtual camera angle setting within the reference database 250 that has the above-identified y-orientation value. The field-of-view value with the lowest difference is selected by the translation controller 236.

For example, to determine the x-orientation value, the translation controller 236 compares the average y-values of two or more static features with the above-identified y-orientation value and field-of-view value. For example, the reference database 250 stores x-orientation entries with predetermined average y-values for the two or more static features when the identified y-orientation value and the identified field-of-view value are constant. Example x-orientation entries in the reference database 250, with constant y-orientation and field-of-view values, for average y-values of bottom and top edges of the boards are provided below in Table 2:

TABLE 2

| Field-of-View Value | Y-Orientation Value | X-Orientation Value | Bottom Avg. Y-Value | Top Avg. Y-Value |
|---|---|---|---|---|
| 15.00 | 170.00 | 07.00 | 636.81 | 561.24 |
| 15.00 | 170.00 | 08.00 | 588.69 | 513.328 |
| 15.00 | 170.00 | 09.00 | 540.69 | 465.302 |
| 15.00 | 170.00 | 10.00 | 492.802 | 417.384 |
| 15.00 | 170.00 | 11.00 | 445.192 | 369.825 |
| 15.00 | 170.00 | 12.00 | 397.424 | 322.256 |
| 15.00 | 170.00 | 13.00 | 349.508 | 274.317 |
| 15.00 | 170.00 | 14.00 | 301.778 | 226.516 |
| 15.00 | 170.00 | 15.00 | 254.216 | 178.659 |
| 15.00 | 170.00 | 16.00 | 206.392 | 130.675 |
| 15.00 | 170.00 | 17.00 | 158.432 | 82.5159 |
| 15.00 | 170.00 | 18.00 | 110.392 | 34.384 |

The translation controller 236 identifies the average y-values for the two or more static features, such as the top and bottom edges of the boards, within the selected frame. The translation controller 236 then selects two x-orientation entries having respective average y-values between which the average y-values of the selected frame are positioned. For example, if the average y-value for the bottom edge of the boards within the selected frame is 310 and the average y-value for the top edge of the boards within the selected frame is 235, the translation controller 236 selects the x-orientation entries within Table 2 that have an x-orientation value of 13.00 and 14.00, respectively. Subsequently, the translation controller 236 (1) uses linear interpolation to identify a first adjustment y-value (e.g., 0.172) for the first static feature based on the proximity of the average y-value of the selected frame (e.g., 310) to that of the selected x-orientation entries (e.g., 301.778 and 349.508), (2) uses linear interpolation to identify a second adjustment y-value (e.g., 0.177) for the second static feature based on the proximity of the average y-value of the selected frame (e.g., 235) to that of the selected x-orientation entries (e.g., 226.516 and 274.317), (3) determines an average adjustment value of the first and second adjustment values (e.g., 0.1745), and (4) uses the average adjustment value to determine an x-orientation value (e.g., 13.8255) that corresponds with the average y-values of the selected frame by adjusting the x-orientation value of the closest x-orientation entry with the average adjustment value.

At block 735, the translation controller 236 identifies a matching virtual camera angle setting based on the comparison performed at block 730. For example, the matching virtual camera angle setting identified by the translation controller 236 includes and is formed from the y-orientation value, the x-orientation value, and the field-of-view value selected at block 730. The matching virtual camera angle setting matches the physical camera angle setting of the physical camera that captured the selected frame.

At block 740, the translation controller 236 records the identified camera angle setting for the selected frame in the 3D database 260. At block 745, the translation controller 236 determines whether there is another frame in the current tracking session. In response to the translation controller 236 determining that there is another frame, the method 430 proceeds to block 750 at which the translation controller 236 selects the next subsequent frame in the current tracking session. Upon completion of block 750, the method 430 returns to block 710. Returning to block 745, the method 430 proceeds to block 755 in response to the translation controller 236 determining that there is not another frame in the current training session.

At block 755, the translation controller 236 determines whether there is another tracking session for the recorded single video stream. In response to the translation controller 236 determining that there is another tracking session, the method 430 proceeds to block 760 at which the translation controller 236 selects the first frame of the next subsequent tracking session of the recorded single video stream. Upon completion of block 760, the method 430 returns to block 710. Returning to block 755, the method 430 ends in response to the translation controller 236 determining that there is not another training session.

Returning to FIG. 4, after the translation controller 236 identifies the physical camera angle settings of the frames at block 430, the method 400 proceeds to block 435 at which the translation controller 236 translates two-dimensional locations of objects-of-interest from the frames within the tracking sessions of the single video stream and into three-dimensional locations on the virtual field-of-play rendering. As disclosed below in greater detail, the translation controller 236 translates the locations of the objects-of-interest into three-dimensional locations on virtual field-of-play rendering to enable advanced sporting analytics to be performed for the sporting event played on the physical field-of-play 10.

Figure 8:
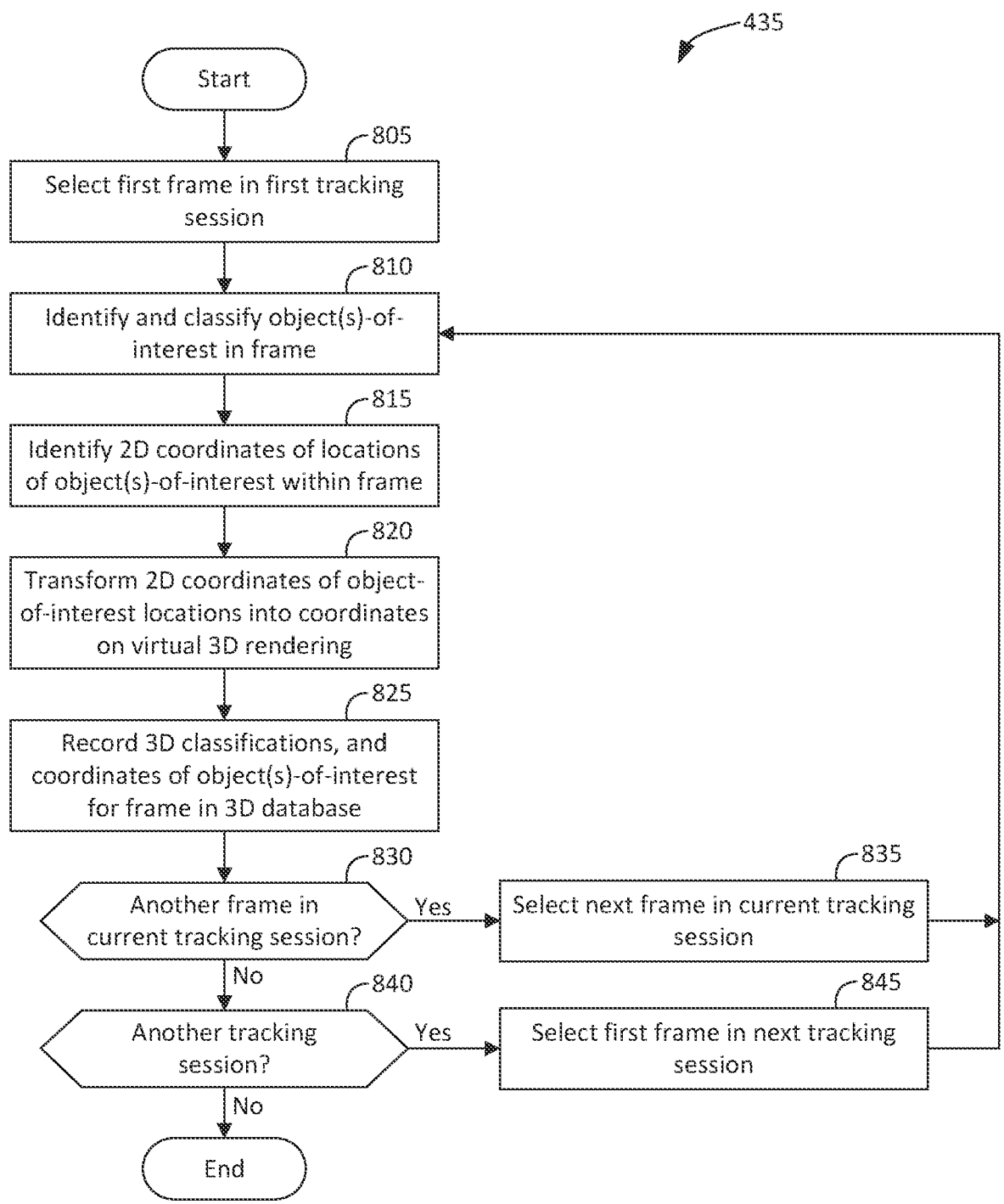
FIG. 8 represents a subprocess of the process of FIG. 4 for locating objects-of-interest within the frames of the tracking sessions.

FIG. 8 is a flowchart that depicts an example method 435 for performing the block 435 of FIG. 4. Initially, at block 805, translation controller 236 selects the first frame in the first tracking session of the recorded single video stream.

At block 810, the translation controller 236 identifies the presence of and classifies object(s)-of-interest within the selected frame, for example, using image recognition algorithm(s), machine learning algorithm(s), point clustering algorithm(s), and/or other type(s) of algorithm(s). Example classified objects include players, balls, pucks, referees, and/or other object(s) that move along the field-of-play 10 during a sporting event. At block 815, the translation controller 236 identifies the translation controller 236 identifies two-dimensional coordinates (e.g., x- and y-coordinates) of the selected object(s)-of-interest within the selected frame.

At block 820, the translation controller 236 transforms the two-dimensional location coordinates of the object(s)-of-interest within the selected frame of the recorded single video stream into virtual location coordinates on the virtual rendering 1300 of the field-of-play 10. That is, the translation controller 236 identifies the location(s) of the object(s)- of-interest on the field-of-play 10 and subsequently generates corresponding location coordinates on the virtual rendering 1300 for those object(s)-of-interest.

In order to determine the location of each object-of-interest on the field-of-play 10, translation controller 236 uses the two-dimensional location coordinates of the object-of-interest within the respective frame and the identified camera setting, including the camera position setting and the camera angle setting, corresponding with the frame. In other words, the translation controller 236 is able to locate the position of each object-of-interest on the field-of-play by (1) determining the two-dimensional location of the object-of-interest within a frame of the single two-dimensional video stream, (2) determining the camera setting of the physical camera that captured the frame, and (3) using geometry principles to locate the object-of-interest on the field-of-play 10 based on the location within the frame and the camera setting. The translation controller 236 transforms the two-dimensional location coordinates of the object(s)-of-interest within a frame into virtual location coordinates on the virtual rendering 1300 in an automated manner. For example, the translation controller 236 uses a built function of a three-dimensional development platform, such as the "ScreenPointToRay" and/or the "ScreenToWorldPoint" functions of the Unity software, to automatically convert the two-dimensional coordinates within the frame into a location on the virtual rendering 1300. The "ScreenPointToRay" and/or the "ScreenToWorldPoint" functions facilitate the translation controller 236 in converting the two-dimensional coordinates within the frame into a location on the virtual rendering 1300 by (1) generating a ray or straight line within the virtual rendering 1300 that extends from the two-dimensional coordinates of an object-of-interest and (2) identifying a point that is located along the ray or straight line and adjacent to the sporting surface to account for a height of the object-of-interest on the sporting surface.

At block 825, the translation controller 236 records the classification(s) and virtual coordinate(s) of the object(s)-of-interest within the selected frame and a frame identifier of the selected frame as an entry in the 3D database 260.

At block 830, the translation controller 236 determines whether there is another frame in the current tracking session. In response to the translation controller 236 determining that there is another frame, the method 435 proceeds to block 835 at which the translation controller 236 selects the next subsequent frame in the current tracking session. Upon completion of block 835, the method 435 returns to block 810. Returning to block 830, the method 435 proceeds to block 840 in response to the translation controller 236 determining that there is not another frame in the current training session.

At block 840, the translation controller 236 determines whether there is another tracking session for the recorded single video stream. In response to the translation controller 236 determining that there is another tracking session, the method 435 proceeds to block 845 at which the translation controller 236 selects the first frame of the next subsequent tracking session of the recorded single video stream. Upon completion of block 845, the method 435 returns to block 810. Returning to block 840, the method 435 ends in response to the translation controller 236 determining that there is not another training session.

Returning to FIG. 4, after the translation controller 236 translates object(s)-of-interest on the physical field-of-play 10 from the frames within the tracking sessions onto the virtual field-of-play rendering at block 435, the method 400 proceeds to block 440 at which the translation controller 236 tracks objects-of-interest between frames of the virtual field-of-play rendering. As disclosed below in greater detail, the translation controller 236 tracking objects-of-interest between frames expedites the quick identification of each of the objects within the frames.

Figure 9:
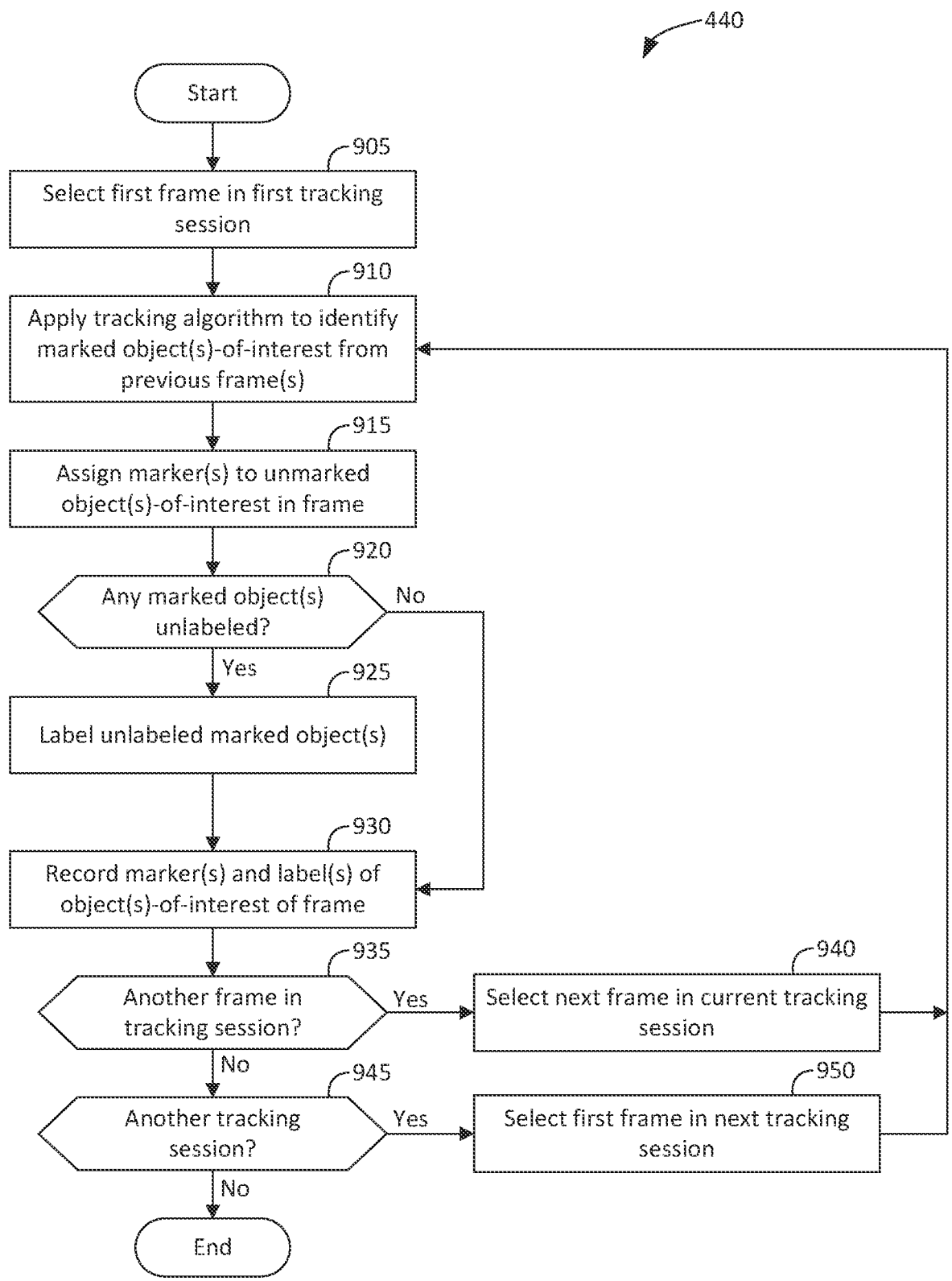
FIG. 9 represents a subprocess of the process of FIG. 4 for tracking objects-of-interests within the frames of the tracking sessions.

FIG. 9 is a flowchart that depicts an example method 440 for performing the block 440 of FIG. 4. Initially, at block 905, the translation controller 236 selects the first frame in the first tracking session of the recorded single video stream. At block 910, the translation controller 236 applies a tracking algorithm to identify any object(s)-of-interest within the selected frame as corresponding to marked object(s) from previous frame(s) within the selected training session. As disclosed below in greater detail, a marked object has a respective marker IDs that is used to quickly track the marked object across subsequent frames within the selected tracking session. For example, the tracking algorithm uses image recognition algorithm(s), machine learning algorithm(s), and/or other type(s) of algorithm(s) to determine whether an object within a frame is positioned near a similar object of an immediately preceding or subsequent frame. If the tracking algorithm determines that there is only one object of a particular type in similar positions within the adjacent frames, the tracking algorithm identifies that object as the same object in each of the frames in order to track that object between those frames.

At block 915, the translation controller 236 assigns unique marker IDs to respective unmarked object(s)-of-interest within the frame. For example, each object-of-interest within the selected frame is assigned a respective unique marker ID. The translation controller 236 marks the previously-unmarked object(s)-of-interest to enable the tracking algorithm to quickly identify those object(s) in subsequent frames within the selected tracking session. In some examples, the translation controller 236 uses image recognition and other automated algorithm(s) to mark previously unmarked object(s)-of-interest with unique marker IDs. Additionally or alternatively, the translation controller 236 enables an operator of the analytics system to identify and mark previously unmarked object(s)-of-interest.

Figure 20:
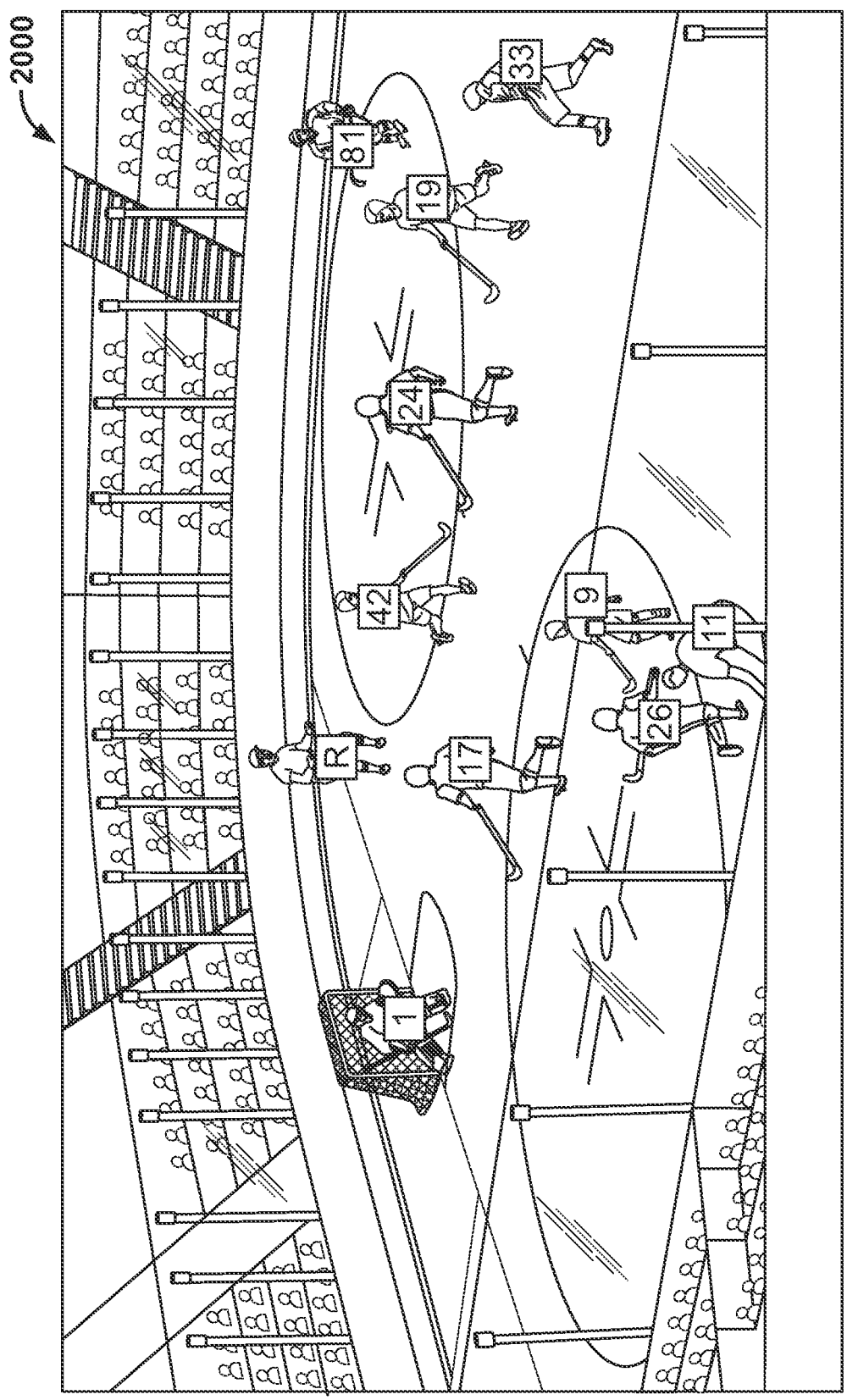
FIG. 20 is an annotated version of the frame of FIG. 18.

At block 920, the translation controller 236 determines whether any of the marked objects are unlabeled. A labeled object is labeled with a respective real-world identifier. An example label includes a combination of team identifier (e.g., home, away, team name, etc.) and uniform number of a player (e.g., player #19 of the Chicago Hockey Team). FIG. 20 depicts an example frame 2000 in which each of the players in the sporting event is a labeled object. In some examples, if (1) an object-of-interest within the selected frame was marked based on a previous frame using the tracking algorithm and (2) the previously-marked object was also previously labeled, then the translation controller 236 also labels the object-of-interest as the object-of-interest is marked.

In response to the translation controller 236 determining that there are not unlabeled object(s) within the selected frame (i.e., the translation controller 236 determines that each of the object(s)-of-interest within the frame are labeled), the method 440 proceeds to block 930. Otherwise, in response to the translation controller 236 determining that there are one or more unlabeled objects within the selected frame, the method 440 proceeds to block 925 at which translation controller 236 labels the unlabeled marked object(s)-of-interest. In some examples, the translation controller 236 uses image recognition and other automated algorithm(s) to label previously unlabeled objects. Additionally or alternatively, the translation controller 236 enables an operator of the analytics system to identify and label previously unlabeled objects.

At block 930, the translation controller 236 records the marker IDs and/or the labels for the objects-of-interest within the selected frame. For example, the translation controller 236 records the marker IDs and/or the labels of the objects-of-interest within respective entries in the 3D database 260 for subsequent analysis.

At block 935, the translation controller 236 determines whether there is another frame in the current tracking session. In response to the translation controller 236 determining that there is another frame, the method 440 proceeds to block 940 at which the translation controller 236 selects the next subsequent frame in the current tracking session. Upon completion of block 940, the method 440 returns to block 910. Returning to block 935, the method 440 proceeds to block 945 in response to the translation controller 236 determining that there is not another frame in the current training session.

At block 945, the translation controller 236 determines whether there is another tracking session for the recorded single video stream. In response to the translation controller 236 determining that there is another tracking session, the method 440 proceeds to block 950 at which the translation controller 236 selects the first frame of the next subsequent tracking session of the recorded single video stream. Upon completion of block 950, the method 440 returns to block 910. Returning to block 945, the method 440 ends in response to the translation controller 236 determining that there is not another training session.

Returning to FIG. 4, after the translation controller 236 tracks objects-of-interest between frames at block 440, the method 400 proceeds to block 445 at which the translation controller 236 interpolates location(s) of respective object(s)-of-interest that are missing from one or more of the frames within the single video stream of the sporting event. As disclosed below in further detail, the translation controller 236 interpolating locations of respective objects-of-interest enables the locations of those objects-of-interest to be estimated for frames in which they are out-of-view.

Figure 10:
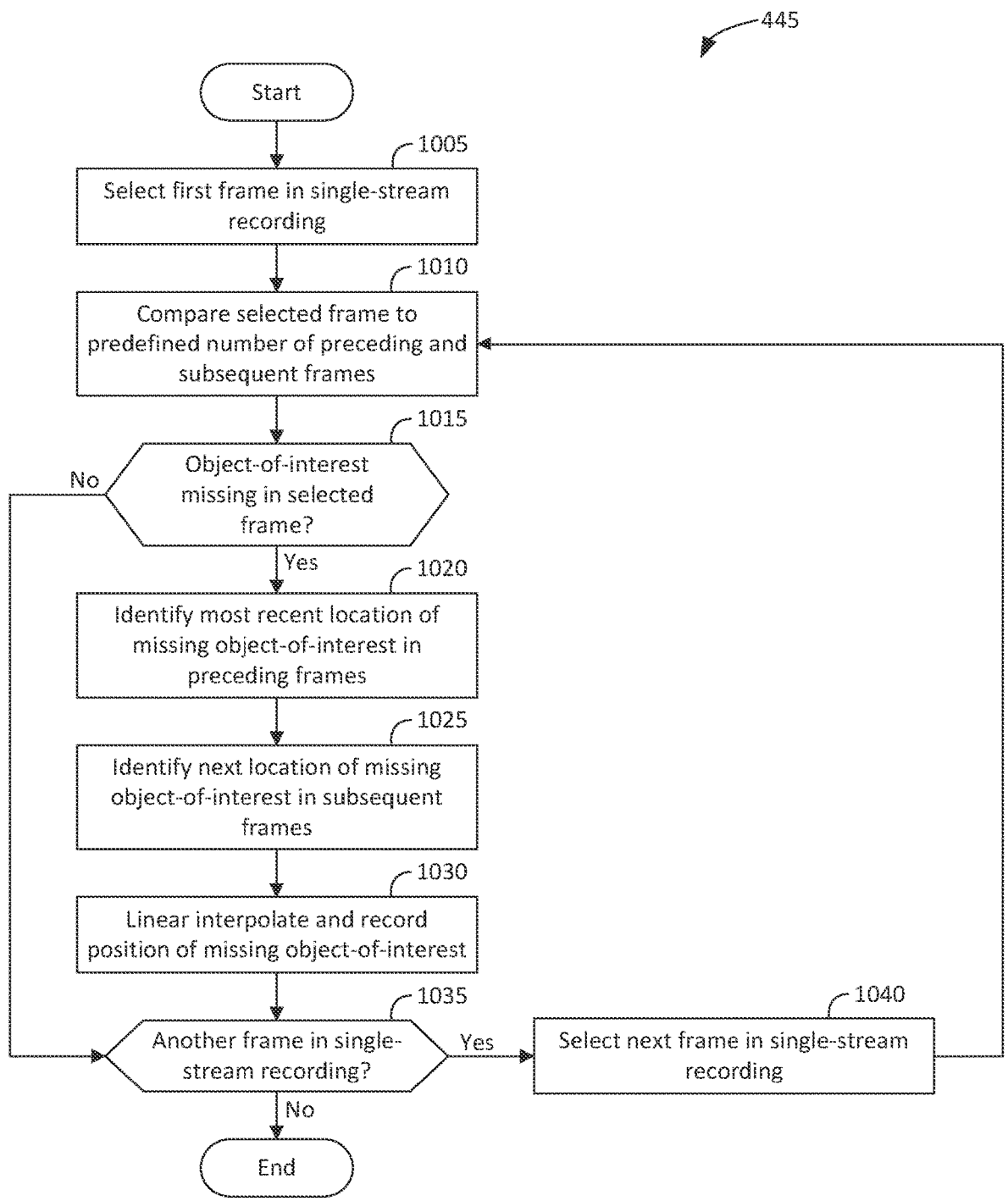
FIG. 10 represents a subprocess of the process of FIG. 4 for interpolating positions of objects-of-interest within frames of the single two-dimensional video stream.

FIG. 10 is a flowchart that depicts an example method 445 for performing the block 445 of FIG. 4. Initially, at block 1005, the translation controller 236 selects the first frame within the recorded single video stream. At block 1010, the translation controller 236 compares the object(s)-of-interest within the selected frame to object(s)-of-interest within a predefined number of preceding frames and a predefined number of subsequent frames. At block 1015, the translation controller 236 determines whether any object(s)-of-interest are missing from the selected frame based on the comparison at block 1010. For example, the translation controller 236 determines that an object-of-interest is missing from the selected frame if the object-of-interest is (1) not present in the selected frame, (2) present within one or more of the predefined number of preceding frames, and (3) present within one or more of the predefined number of subsequent frames. For example, an object-of-interest may be missing from the selected frame as a result of moving in an out of the view of the camera capturing the frames. In the illustrated example, the translation controller 236 compares the selected frame to a limited number of preceding and subsequent frames to ensure that the object-of-interest in question has remained on the field-of-play 10 while being out-of-frame. If an object-of-interest is out-of-frame for an extended period of time, the translation controller 236 determines that the object-of-interest is not on the field-of-play during the time corresponding with the selected frame.

In response to the translation controller 236 determining that there are no objects-of-interest missing from the selected frame, the method 445 proceeds to block 1035. Otherwise, in response to the translation controller 236 determining that there are object(s)-of-interest missing from the selected frame, the method 445 proceeds to block 1020.

At block 1020, for each of the object(s)-of-interest missing from the selected frame, the translation controller 236 identifies the most recent virtual location of the missing object-of-interest in the preceding frames based on entries within the 3D database 260. At block 1025, for each of the object(s)-of-interest missing from the selected frame, the translation controller 236 identifies the most recent virtual location of the missing object-of-interest in the subsequent frames based on entries within the 3D database 260.

At block 1030, for each of the object(s)-of-interest missing from the selected frame, the translation controller 236 (1) estimates the virtual location of the missing object-of-interest on the virtual rendering 1300 using linear interpolation (sometimes referred to as "lerp") and (2) records the virtual location of the missing object-of-interest in the 3D database 260. The translation controller 236 linearly interpolates the virtual location of a missing object-of-interest by comparing (1) the most recent known location of the object-of-interest identified at block 1020 and a time stamp of the corresponding frame with (2) the next known location of the object-of-interest identified at block 1025 and a time stamp of the corresponding frame.

At block 1035, the translation controller 236 determines whether there is another frame in the recorded single video stream? In response to the translation controller 236 determining that there is not another frame, the method 445 ends. Otherwise, in response to the translation controller 236 determining that there is another frame, the method 445 proceeds to block 1040 at which the translation controller 236 selects the next frame in the recorded single video stream.

Returning to FIG. 4, after the translation controller 236 interpolates locations of objects-of-interest, the method 400 proceeds to block 450 at which the analytics controller 238 of the processor(s) 230 presents a virtual video rendering of the sporting event on the virtual three-dimensional rendering. The analytics controller 238 generates the virtual video rendering to enable the user 55 to review the sporting event from different perspectives, compared to that of the recorded single video stream, in order to gain a better understanding of events during the sporting events.

Figure 11:
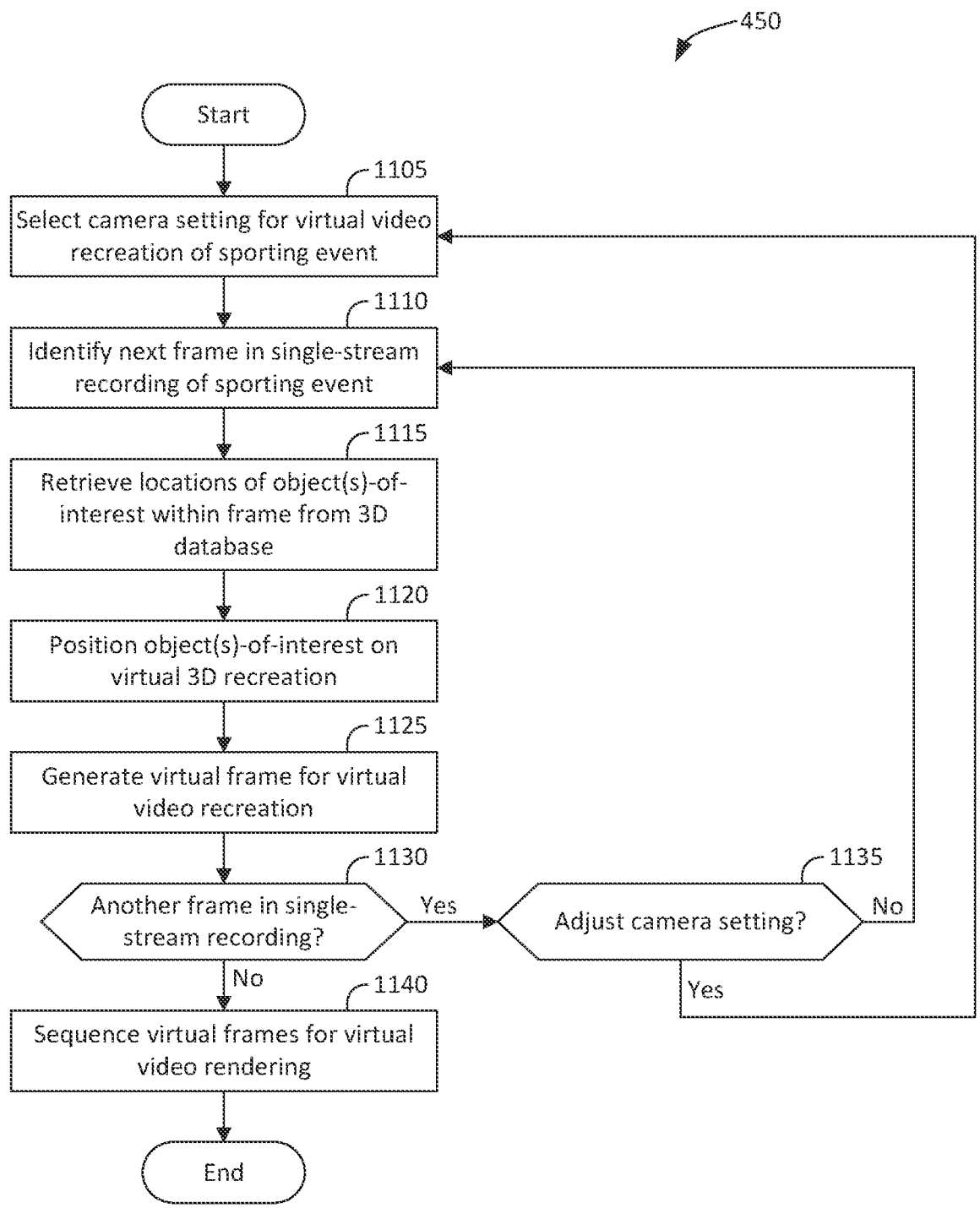
FIG. 11 represents a subprocess of the process of FIG. 4 for recreating the sporting event within the virtual three-dimensional field-of-play rendering.
Figure 21:
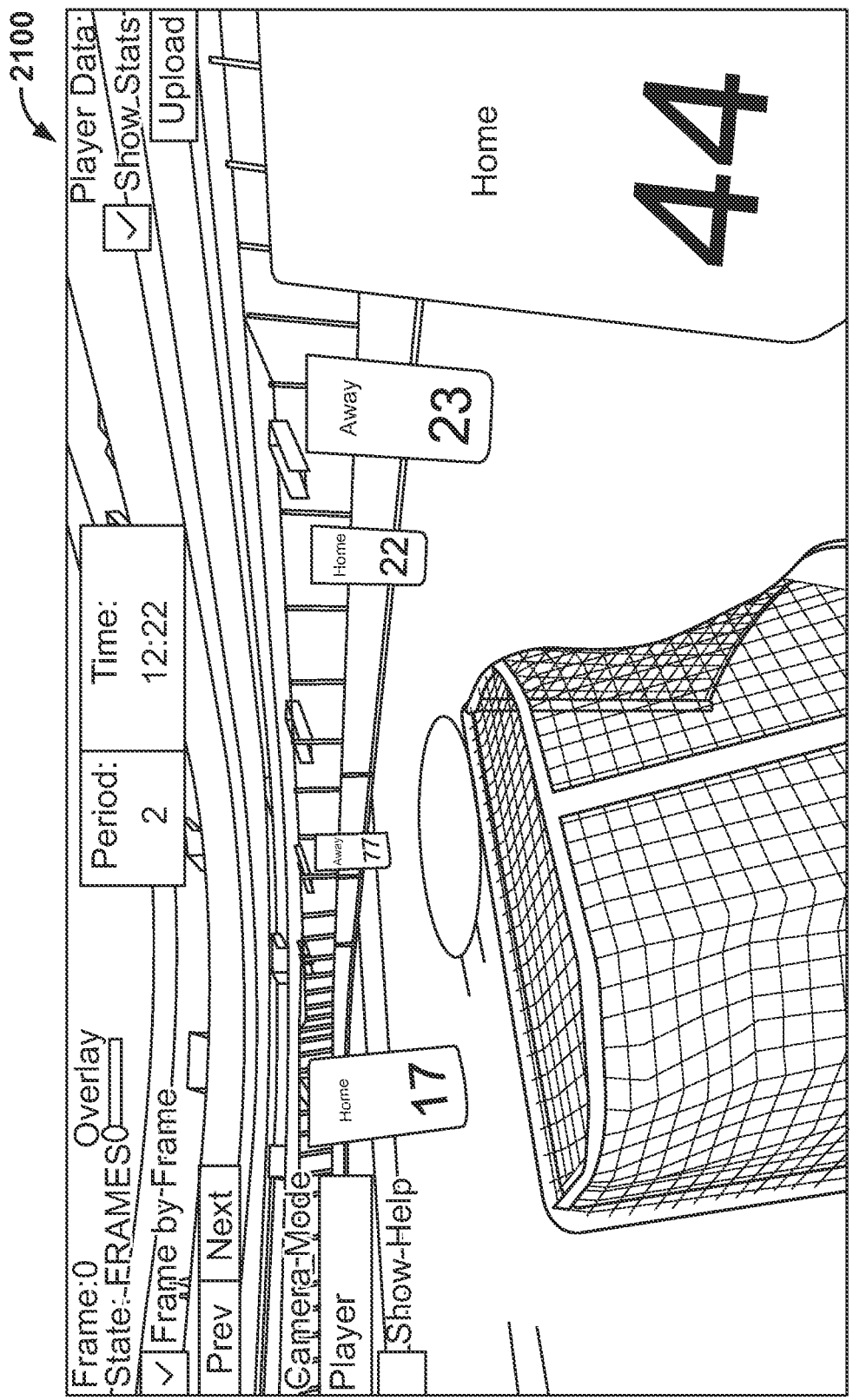
FIG. 21 depicts an example frame of a virtual video rendering of a sporting event within the virtual three-dimensional field-of-play rendering of FIG. 13 in accordance with the teachings herein.

FIG. 11 is a flowchart that depicts an example method 450 for performing the block 450 of FIG. 4. Initially, at block 1105, the analytics controller 238 of the processor(s) 230 selects a virtual camera setting, including a virtual camera position setting and a virtual camera angle setting, for the virtual video rendering of the sporting event. For example, the virtual camera setting may be selected automatically by the analytics controller 238, the user 55, and/or an operator of the analytics system 100. The virtual camera setting is selected from a plurality of camera settings that include those of the entries within the reference database 250 and/or those that do not correspond with entries within the reference database 250. In some examples, the camera setting selected by the analytics controller 238 may correspond with a position on the field-of-play 10 from which a physical camera (e.g., the cameras 20) would not be able to capture images during a sporting event. For example, the selected camera setting may be from the perspective of a goal and/or a particular player on the field-of-play 10. FIG. 21 depicts an example virtual frame 2100 of a virtual video rendering of a sporting event from a perspective behind a goal of the field-of-play 10.

At block 1110, the analytics controller 238 identifies the next frame in the recorded single video stream of the sporting event. At block 1115, the analytics controller 238 retrieves the virtual locations of the object(s)-of-interest that are present in the identified frame from the 3D database 260. At block 1120, the analytics controller 238 positions virtual renderings of the object(s)-of-interest at respective virtual location(s) on the virtual rendering 1300. For example, the analytics controller 238 uses a built function of a three-dimensional development platform to automatically position virtual renderings of the object(s)-of-interest at respective virtual location(s) on the virtual rendering 1300 that was generated by the three-dimensional development platform. At block 1125, the analytics controller 238 causes the virtual camera 1350 to generate a corresponding virtual frame for the virtual video recreation from the selected camera setting (e.g., using the three-dimensional development platform) and stores the virtual frame in the analytics database 270 for subsequent presentation.

At block 1130, the analytics controller 238 determines whether there is another frame in the recorded single video stream. In response to the analytics controller 238 determining that there is not another frame, the method 450 proceeds to block 1140. Otherwise, in response to the analytics controller 238 determining that there is another frame, the method 450 proceeds to block 1135 at which the analytics controller 238 determines whether to adjust the virtual camera setting for subsequent virtual frame(s). For example, the analytics controller 238 adjusts the camera setting for the virtual camera 1350 in response to receiving a corresponding command from the user 55, and/or an operator of the analytics system 100. In response to the analytics controller 238 determining that the virtual camera setting is not adjusted, the method 450 returns to block 1110. Otherwise, in response to the analytics controller 238 determining that the virtual camera setting is adjusted, the method 450 returns to block 1105.

Returning to block 1140 once the last frame in the single video stream is reached, the analytics controller 238 sequences the virtual frames into the virtual video rendering. In some examples, the virtual video rendering is presented to the user 55 in real-time as the analytics controller 238 generates the virtual frames of the virtual video rendering. In such examples, the user 55 is able to adjust the selected camera settings in real-time such that the perspective from which the virtual rendering is played changes in real-time as the user 55 selects different camera settings in real-time.

Returning to FIG. 4, the analytics controller 238 of the processor(s) 230 generate reports of sports analytics at block 455. The analytics controller 238 generates the reports to enable the user 55 to review detailed sports analytics involving the sporting event to facilitate athletes, trainers, coaches, and/or sports organizations in making decisions during and prior to subsequent sporting events.

Figure 12:
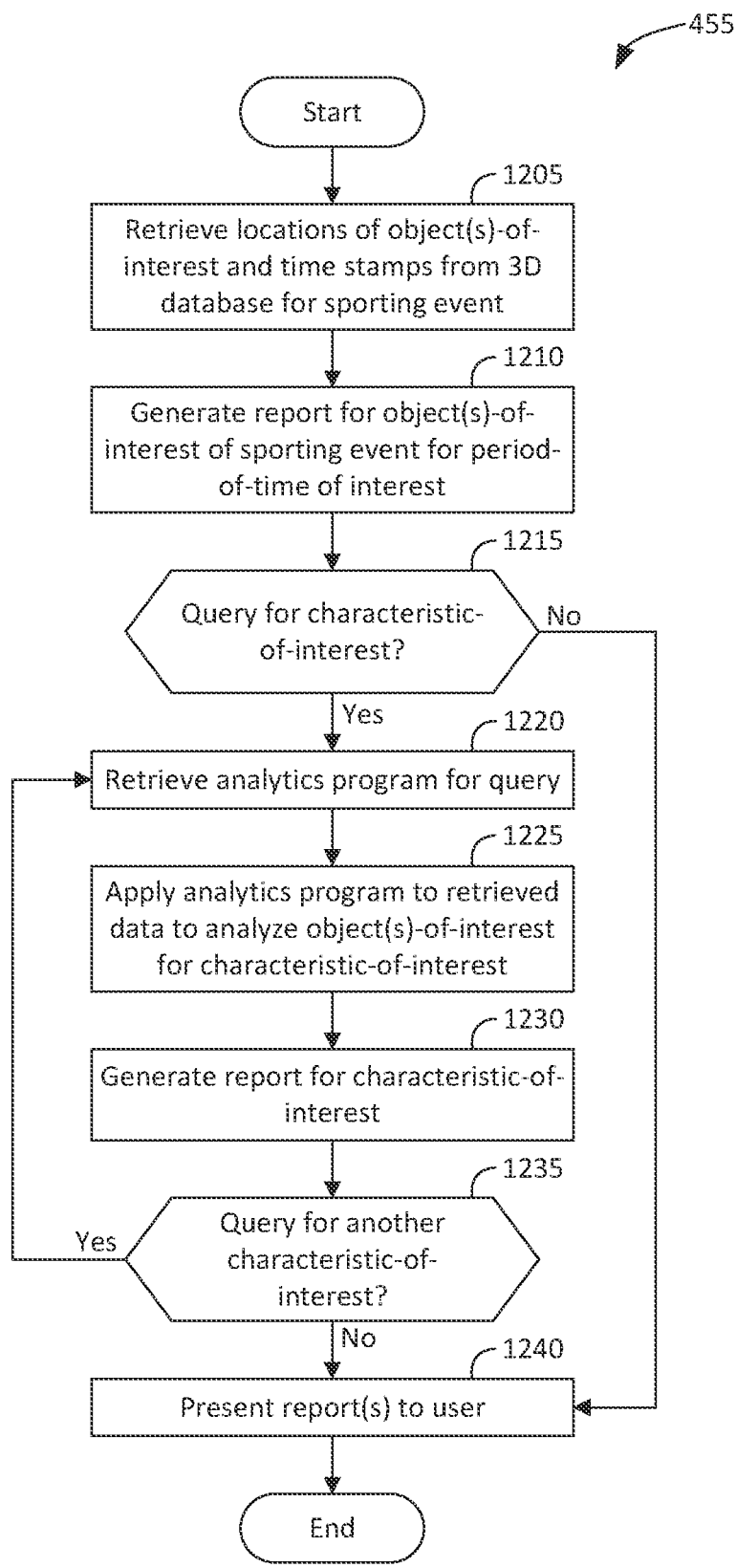
FIG. 12 represents a subprocess of the process of FIG. 4 for generating analytics of the sporting event.

FIG. 12 is a flowchart that depicts an example method 455 for performing the block 455 of FIG. 4. Initially, at block 1205, the analytics controller 238 retrieves locations of object(s)-of-interest and time stamps of corresponding virtual images from the 3D database 260 for a predetermined period of time (e.g., the entirety, a period or quarter, times during which a particular player is on the field-of-play 10, etc.) of the sporting event. At block 1210, the analytics controller 238 generates a report on the locations of the object(s)-of-interest (e.g., all players and the puck) for the selected period-of-time that is of interest (e.g., the entirety of the game).

At block 1215, the analytics controller 238 determines whether to query for a characteristic-of-interest of the sporting event. For example, the analytics system 100 may receive a query from the user 55 via the computing device 50 and the network 45. As used herein, a "characteristic-of-interest" refers to a particular statistic related to one or more sporting events. Example characteristics-of-interest include the number of occurrences within one sporting event (e.g., the number of penalties within one game) or multiple sporting events (e.g., the number of penalties given to one particular player over the entire season). In response to the analytics controller 238 determining that there is not a query for a characteristic-of-interest, the method 455 proceeds to block 1240. Otherwise, in response to the analytics controller 238 determining that there is a query for a characteristic-of-interest, the method 455 proceeds to block 1220.

At block 1220, the analytics controller 238 retrieves an analytics program from the analytics database 270 for a query. The analytics database 270 of the illustrated example is configured to store a plurality of previously-generated programs with each program configured to identify a respective characteristic-of-interest. Example programs stored by the analytics database 270 for respective characteristics-of-interest include an offsides-counter program, a per-zone-duration program (e.g., neutral zone duration, offensive zone duration, defensive zone duration), a consecutive-pass-count-for-goal program, a carries-versus-passes-in-transition program, etc. At block 1225, the analytics controller 238 applies the retrieved analytics program to the data retrieved from the 3D database for the object(s)-of-interest to generate for the characteristic-of-interest. At block 1230, the analytics controller 238 generates a report for the characteristic-of-interest. In some examples, the report generated in by the analytics controller 238 is in the form of a spreadsheet with each line the spreadsheet corresponding with the position of a particular player at a particular point-in-time of the sporting event.

At block 1235, the analytics controller 238 determines whether there is a query for another characteristic-of-interest. In response to the analytics controller 238 determining that there is a query for another characteristic-of-interest, the method 455 returns to block 1220. Otherwise, in response to the analytics controller 238 determining that there is not a query for another characteristic-of-interest, the method 455 proceeds to block 1240 at which the analytics controller 238 sends and/or presents the generated report(s) to the user 55, for example, via the computing device 50. For example, the analytics controller 238 causes the transceiver 220 to transmit the report(s) to the computing device 50 via email, a browser-based portal, an app-based portal, etc.

As shown in FIGS. 1-21, the analytics system 100 and the method 400 are capable of generating sports analytics for the sport of hockey based on single video streams of respective hockey games. It should be appreciated that the analytics system 100 and the method 400 are capable of generating sports analytics for other types of sports (e.g., basketball, soccer, tennis, etc.) based on single video streams. Additionally, it should be appreciated that the analytics system 100 is capable of generating analytics based on single video streams for events outside of a sporting environment. For example, the analytics system 100 and the method 400 can be configured to monitor a room (e.g., determine a walking speed of a person through the room) such as for security purposes and/or to facilitate a robot to navigate a real-world environment.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for translating two-dimensional sporting event video streams onto virtual three-dimensional fields-of-play, the system comprising:
    a reference database configured to store information of a virtual three-dimensional rendering of a physical field-of-play;
    one or more processors configured to:
        generate the virtual three-dimensional rendering;
        generate camera angle entries of the reference database each of which corresponds with a virtual image of the virtual three-dimensional rendering captured from a virtual camera position setting and includes a virtual camera angle setting at which the virtual image is captured and two-dimensional coordinates of one or more static features of the virtual three-dimensional rendering;
        for each frame within one of a plurality of tracking sessions of a two-dimensional video stream of a sporting event occurring on the physical field-of-play:
            identify two-dimensional coordinates of one or more static features of the physical field-of-play;
            determine a matching virtual camera angle setting by comparing the two-dimensional coordinates of the one or more static features of the physical field-of-play to the two-dimensional coordinates of the one or more static features of the camera angle entries in the reference database; and
            translate objects-of-interest within the frame onto the virtual three-dimensional rendering based on the virtual camera position setting and the matching virtual camera angle setting.

2. The system of claim 1, wherein the virtual camera angle setting of each of the camera angle entries of the reference database includes an x-axis rotation, a y-axis rotation, and a field-of-view.

3. The system of claim 1, wherein the one or more processors are configured to create a virtual video rendering of the sporting event on the virtual three-dimensional rendering based on the translation of the objects-of-interest onto the virtual three-dimensional rendering for each of the frames of the plurality of tracking sessions.

4. The system of claim 3, wherein the one or more processors are configured to create the virtual video rendering from one or more selectable virtual camera settings.

5. The system of claim 1, wherein the one or more processors are configured to generate sports analytics for the sporting event based on an analysis of locations of the objects-of-interest on the virtual three-dimensional rendering for one or more of the frames of the plurality of tracking sessions.

6. The system of claim 1, wherein each of the two-dimensional coordinates of the one or more static features within a respective virtual image of the virtual three-dimensional rendering includes an x-coordinate and a y-coordinate within the virtual image.

7. The system of claim 6, wherein each of the two-dimensional coordinates of the one or more static features of the physical field-of-play includes an x-coordinate and a y-coordinate within a respective frame of the two-dimensional video stream.

8. The system of claim 1, wherein, to translate the objects-of-interest onto the virtual three-dimensional rendering for each frame, the one or more processors are further configured to:
    identify two-dimensional coordinates of the objects-of-interest within the frame; and
    generate virtual coordinates of the objects-of-interest on the virtual three-dimensional rendering based on the two-dimensional locations of the objects-of-interest within the frame, the virtual camera position setting, and the matching virtual camera angle setting.

9. The system of claim 8, further comprising a 3D database configured to store the virtual coordinates of the objects-of-interest on the virtual three-dimensional rendering for each of the frames of the plurality of tracking sessions of the two-dimensional video stream.

10. The system of claim 1, wherein the one or more processors are configured to identify each of the plurality of tracking sessions of the two-dimensional video stream by detecting a respective continuous sequence of the frames that each matches with one of the virtual images stored within the reference database.

11. The system of claim 1, wherein the one or more processors are configured to utilize an image recognition algorithm to detect, classify, and label the objects-of-interest.

12. The system of claim 11, wherein the one or more processors are configured to utilize a tracking algorithm to track the objects-of-interest that have been identified between the frames of a respective one of the plurality of tracking sessions of the two-dimensional video stream.

13. The system of claim 11, wherein, for each of the frames of the plurality of tracking sessions, the one or more processors are configured to:
    determine whether one or more of the objects-of-interest is missing from the frame based on review of the frame, a predefined number of preceding frames, and predefined number of subsequent frames; and
    responsive to determining that one or more of the objects-of-interest is missing from the frame, estimate a location for each of the one or more of the objects-of-interest that is missing utilizing linear interpolation between locations of the each of the one or more of the objects-of-interest within the preceding frames and the subsequent frames.

14. The system of claim 1, wherein the information of the virtual three-dimensional rendering stored in the reference database includes the virtual camera position setting, wherein the one or more processors are configured to retrieve the virtual camera position setting for the virtual three-dimensional rendering from the reference database.

15. The system of claim 14, wherein, prior to the reference database storing the virtual camera position setting, the one or more processors are configured to identify the virtual camera position setting for the virtual three-dimensional rendering.

16. The system of claim 15, wherein, to identify the virtual camera position setting for the virtual three-dimensional rendering, the one or more processors are configured to:
   generate camera position entries of the reference database each of which corresponds with a virtual image of the virtual three-dimensional rendering captured from a virtual camera position setting and includes a virtual camera setting and angle settings at which the virtual image is captured and two-dimensional coordinates of a plurality of preselected static points of the virtual three-dimensional rendering;
   select a frame of the two-dimensional video stream in which each of a plurality of preselected static points of the physical field-of-play is present;
   identify two-dimensional coordinates of the plurality of preselected static points of the physical field-of-play; and
   determine the virtual camera position setting for the virtual three-dimensional rendering by matching the two-dimensional coordinates of the plurality of preselected static points of the physical field-of-play to the two-dimensional coordinates of the plurality of preselected static points of one of the camera position entries in the reference database.

17. A method for translating two-dimensional sporting event video streams onto virtual three-dimensional fields-of-play, the system comprising:
   generating, via one or more processors, a virtual three-dimensional rendering of a physical field-of-play;
   generating, via the one or more processors, camera angle entries of a reference database each of which corresponds with a virtual image of the virtual three-dimensional rendering captured from a virtual camera position setting and includes a virtual camera angle setting at which the virtual image is captured and two-dimensional coordinates of one or more static features of the virtual three-dimensional rendering;
   for each frame within one of a plurality of tracking sessions of a two-dimensional video stream of a sporting event occurring on the physical field-of-play:
      identifying two-dimensional coordinates of one or more static features of the physical field-of-play;
      determine a matching virtual camera angle setting by comparing the two-dimensional coordinates of the one or more static features of the physical field-of-play to the two-dimensional coordinates of the one or more static features of the camera angle entries in the reference database; and
      translating objects-of-interest within the frame onto the virtual three-dimensional rendering based on the virtual camera position setting and the matching virtual camera angle setting.

18. The method of claim 17, further comprising creating a virtual video rendering of the sporting event on the virtual three-dimensional rendering based on the translation of the objects-of-interest onto the virtual three-dimensional rendering for each of the frames of the plurality of tracking sessions.

19. The method of claim 17, further comprising generating sports analytics for the sporting event based on an analysis of locations of the objects-of-interest on the virtual three-dimensional rendering for one or more of the frames of the plurality of tracking sessions.

20. A tangible computer readable medium including instructions that, when executed, cause one or more machines to:
   generate a virtual three-dimensional rendering of a physical field-of-play;
   generate camera angle entries of a reference database each of which corresponds with a virtual image of the virtual three-dimensional rendering captured from a virtual camera position setting and includes a virtual camera angle setting at which the virtual image is captured and two-dimensional coordinates of one or more static features of the virtual three-dimensional rendering;
   for each frame within one of a plurality of tracking sessions of a two-dimensional video stream of a sporting event occurring on the physical field-of-play:
      identify two-dimensional coordinates of one or more static features of the physical field-of-play;
      determine a matching virtual camera angle setting by comparing the two-dimensional coordinates of the one or more static features of the physical field-of-play to the two-dimensional coordinates of the one or more static features of the camera angle entries in the reference database; and
      translate objects-of-interest within the frame onto the virtual three-dimensional rendering based on the virtual camera position setting and the matching virtual camera angle setting.

\* \* \* \* \*